(12) United States Patent
Kim

(10) Patent No.: US 11,192,748 B2
(45) Date of Patent: Dec. 7, 2021

(54) APPARATUS FOR CONTROLLING STRING

(71) Applicant: TYRENN CO., LTD., Seoul (KR)

(72) Inventor: Sug Whan Kim, Gyeonggi-do (KR)

(73) Assignee: TYRENN CO., LTD., Seoul (KR)

( * ) Notice: Subject to any disclaimer, the term of this patent is extended or adjusted under 35 U.S.C. 154(b) by 0 days.

(21) Appl. No.: 16/031,641

(22) Filed: Jul. 10, 2018

(65) Prior Publication Data

US 2018/0319617 A1    Nov. 8, 2018

Related U.S. Application Data

(63) Continuation of application No. PCT/KR2017/001958, filed on Feb. 22, 2017.

(30) Foreign Application Priority Data

Feb. 22, 2017 (KR) .......................... 10-2017-0023676

(51) Int. Cl.
*B65H 54/28* (2006.01)
*F16G 11/12* (2006.01)
(Continued)

(52) U.S. Cl.
CPC ........... *B65H 54/2854* (2013.01); *A41F 1/00* (2013.01); *A43C 11/165* (2013.01); *A44B 11/125* (2013.01); *A45C 13/1046* (2013.01); *B65H 63/086* (2013.01); *F16G 11/12* (2013.01); *F16G 11/14* (2013.01); *A41D 19/0034* (2013.01); *A41D 27/00* (2013.01); *A43C 1/04* (2013.01);
(Continued)

(58) Field of Classification Search
CPC . B65H 54/2854; B65H 63/086; A44B 11/125; A45C 13/1046; A45C 13/10; A45C 13/30; F16G 11/12; F16G 11/14; A41F 1/00; A43C 11/165; A43C 11/16; A43C 1/04; A43C 11/1446; A45F 2003/001; A45F 3/04; A41D 19/0034; A41D 27/00
See application file for complete search history.

(56) References Cited

U.S. PATENT DOCUMENTS 4,660,300 A * 4/1987 Morell .................. A43C 11/16
24/68 SK
9,681,705 B2 * 6/2017 Trudel ..................... A43C 7/00
(Continued)

FOREIGN PATENT DOCUMENTS

JP    2011-001080 A    1/2011
KR    10-0929587    12/2009
(Continued)

*Primary Examiner* — William A. Rivera
(74) *Attorney, Agent, or Firm* — Lex IP Meister, PLLC

(57) ABSTRACT

The present invention relates to a string adjusting device. According to the present invention, there is provided a string adjusting device, including: a base unit including a base plate, a cylindrical lower housing provided on the base plate, and stop protrusions formed to protrude from an outer surface of the lower housing; and a rotation unit including a bobbin rotatably installed inside the housing and configured such that a string is wound therearound, a rotation head connected to one end portion of the bobbin, and an engagement member formed and provided inside the rotation head to be elastically deformable and configured to be caught on the stop protrusions.

9 Claims, 21 Drawing Sheets

(51) Int. Cl.

| | | |
|---|---|---|
| *B65H 63/08* | (2006.01) | |
| *F16G 11/14* | (2006.01) | |
| *A41F 1/00* | (2006.01) | |
| *A43C 11/16* | (2006.01) | |
| *A44B 11/12* | (2006.01) | |
| *A45C 13/10* | (2006.01) | |
| *A45F 3/00* | (2006.01) | |
| *A45F 3/04* | (2006.01) | |
| *A43C 1/04* | (2006.01) | |
| *A43C 11/14* | (2006.01) | |
| *A41D 19/00* | (2006.01) | |
| *A45C 13/30* | (2006.01) | |
| *A41D 27/00* | (2006.01) | |

(52) U.S. Cl.
 CPC ........... *A43C 11/1446* (2013.01); *A43C 11/16* (2013.01); *A45C 13/10* (2013.01); *A45C 13/30* (2013.01); *A45F 3/04* (2013.01); *A45F 2003/001* (2013.01)

(56) References Cited

U.S. PATENT DOCUMENTS

| | | | |
|---|---|---|---|
| 9,839,273 B2* | 12/2017 | Nam | A45C 13/10 |
| 10,039,345 B2* | 8/2018 | Ha | A43C 11/16 |
| 10,264,852 B2* | 4/2019 | Kim | B65H 75/4431 |
| 10,470,525 B2* | 11/2019 | Chen | A43C 11/165 |
| 2006/0053845 A1* | 3/2006 | Benda | E05B 67/006 70/18 |
| 2010/0139057 A1* | 6/2010 | Soderberg | B65H 75/4434 24/68 R |
| 2016/0198801 A1* | 7/2016 | Kim | B65H 75/4431 24/68 C |
| 2017/0224056 A1* | 8/2017 | Midorikawa | A43B 23/02 |
| 2019/0174872 A1* | 6/2019 | Kawano | A43C 11/165 |

FOREIGN PATENT DOCUMENTS

| | | |
|---|---|---|
| KR | 10-0986674 B1 | 10/2010 |
| KR | 10-2015-0032516 A | 3/2015 |
| KR | 10-2016-0146264 A | 12/2016 |

* cited by examiner (a)

(b)

APPARATUS FOR CONTROLLING STRING

CROSS-REFERENCE TO RELATED APPLICATIONS

This application is a continuation application of International Application No. PCT/KR2017/001958 filed on Feb. 22, 2017 and claims priority to Korean Application No. 10-2017-0023676 filed on Feb. 22, 2017. The applications are incorporated herein by reference.

TECHNICAL FIELD

The present invention relates to a string adjusting device, and more specifically to a string adjusting device which is capable of easily winding and tightening a string, used for various wearable or household products including shoes, a bag, clothing, etc., through rotation, and is also capable of adjusting the characteristics of the string, including shape, length, location, and tension of the string, by means of the resulting effect of the winding and the tightening.

BACKGROUND ART

Generally, strings refer to all types of objects which have a feature of having a significant difference between their length and their thickness or width and also have a characteristic of being wound while being bent. Representative examples thereof may include a string, a wire, a rope, a band, etc.

Generally, various types of wearable products including shoes, bags, backpacks, clothing, etc. are provided with tightening/loosening means using a string or a similar object, for example, a wire, a band, or the like. Furthermore, for example, when heavy machines are handled, ropes made of various materials are used. For example, in the case of shoes, strings are mounted in a zigzag form, and the shoes are brought into tight contact with the feet of a user by tightening the strings by pulling them.

However, since it is considerably burdensome to loosen or tighten strings whenever a user takes off or puts on shoes, the user generally puts on the shoes in a state in which the strings have not been appropriately tightened without complete contact of shoes with the feet of the user. In this case, inconvenience is caused to the user in that the strings need to be pulled and tightened when the user brings the shoes into complete contact with the feet of the user for the purpose of exercise and then the strings need to be loosened again. Furthermore, there is a problem of inconvenience in that the strings need to be tightened when the strings are unintentionally loosened during waling or exercise.

In order to overcome the above problems, Korean Patent No. 10-1569461 (entitled "String Winding and Unwinding Device") is disclosed.

FIG. 1 is a view showing a configuration of a string adjusting device according to a conventional technology.

As shown in FIG. 1, the string adjusting device basically includes a base unit 100, a middle unit 200, a rotation unit 300, and a cover unit 400. A single string adjusting device is formed by combining the above components together.

However, the string adjusting device according to the conventional technology is basically composed of the four components, and thus has a relatively complex structure. Accordingly, the string adjusting device has problems in that a product production process is complex, a manufacturing cost is high, and the thickness of string adjusting device is large, thereby decreasing the aesthetics of a product when the string adjusting device is actually applied to the product.

SUMMARY

The present invention is intended to overcome the above-described problems of the conventional art, and an object of the present invention is to provide a string adjusting device which can achieve: 1) a reduction in the number of parts, 2) the simplicity of a structure, 3) the ease of a production process and a reduction in manufacturing cost, and 4) an increase in the aesthetics of a mounting target product through a reduction in shape, particularly a reduction in thickness.

In order to accomplish the above object, the present invention provides a string adjusting device, including: a base unit including a base plate, a cylindrical lower housing provided on the base plate, and stop protrusions formed to protrude from an outer surface of the lower housing; and a rotation unit including a bobbin rotatably installed inside the housing and configured such that a string is wound therearound, a rotation head connected to one end portion of the bobbin, and an engagement member formed and provided inside the rotation head to be elastically deformable and configured to be caught on the stop protrusions.

The present invention provides a string adjusting device, including: a base unit including a base plate, a cylindrical lower housing provided on the base plate, and an engagement member configured such that one end thereof is fastened to an outer surface of the lower housing and provided to be elastically deformable; and a rotation unit including a bobbin rotatably installed inside the housing and configured such that a string is wound therearound, a rotation head connected to one end portion of the bobbin, and stop protrusions formed to protrude from an inner surface of the rotation head to be caught on the engagement member.

The present invention provides a string adjusting device, including: a base unit including a base plate, a cylindrical lower housing provided on the base plate, and stop protrusions formed to protrude from an inner surface of the lower housing; and a rotation unit including a bobbin rotatably installed inside the housing and configured such that a string is wound therearound, a rotation head connected to one end portion of the bobbin, and an engagement member formed and provided inside the rotation head to be elastically deformable and configured to be caught on the stop protrusions.

The present invention provides a string adjusting device, including: a base unit including a base plate, a cylindrical lower housing provided on the base plate, and an engagement member configured such that one end thereof is fastened to an inner surface of the lower housing and provided to be elastically deformable; and a rotation unit including a bobbin rotatably installed inside the housing and configured such that a string is wound therearound, a rotation head connected to one end portion of the bobbin, and stop protrusions formed to protrude from an inner surface of the rotation head to be caught on the engagement member.

The engagement member may include a fixed end formed as one end thereof and a free end configured to be elastically deformable around the fixed end and to be caught on the stop protrusions.

The engagement member may further comprise: a first stop protrusion formed to protrude from the free end toward the stop protrusions; a second stop protrusion formed to be spaced apart from the first stop protrusion by a preset distance and to protrude; and an inclined portion formed to be inclined with respect to the second stop protrusion to thus allow the stop protrusions to move over the second stop protrusion.

A string holding portion configured to receive a string may be formed to penetrate a center of the bobbin, and string insertion portions configured to allow a string to pass through the string holding portion and exit to an outside may be formed to penetrate opposite surface portions of the lower housing.

The present invention provides a string adjusting device, including: a base unit including a base plate, a cylindrical lower housing provided on the base plate, and an engagement member provided at an upper end of the lower housing to be elastically deformable based on one end; and a rotation unit including a bobbin rotatably installed inside the housing and configured such that a string is wound therearound, a rotation head connected to one end portion of the bobbin, and stop protrusions formed to protrude from a trajectory where the engagement member is located when the rotation head is rotated below the rotation head.

The present invention provides a string adjusting device, including: a base unit including a base plate, and a lower housing provided on the base plate, formed in a cylindrical shape, and configured to include stop protrusions formed to protrude; and a rotation unit including a bobbin rotatably installed inside the housing and configured such that a string is wound therearound, a rotation head connected to one end portion of the bobbin, and stop protrusions elastically deformably provided on a trajectory where the stop protrusions are located when the rotation head is rotated below the rotation head and configured to be caught on the stop protrusions.

The engagement member may include a fixed end formed as one end thereof, a free end configured to extend from the fixed end and to be elastically deformable, and a stop protrusion formed to protrude toward the stop protrusions.

The string adjusting device may further include: a first fastening protrusion formed to protrude from a circumference of an inner surface of the lower housing; a second fastening protrusion formed to protrude at a location which is spaced apart from the first fastening protrusion by a preset distance; a rotation base formed in a disk shape, coupled to a lower end of the bobbin, and located inside the lower housing; and a fastening protrusion formed to further protrude from a side end of the rotation base, and to be selectively caught on the first fastening protrusion or second fastening protrusion.

Insertion recesses may be formed by cutting out parts of the first fastening protrusion and the second fastening protrusion, and the fastening protrusion may pass through the insertion recesses and may be caught on the first fastening protrusion.

The string adjusting device may further include an engagement member configured to include: a stepped recess formed on an inner surface of the lower housing; and a fixed end coupled to an inner surface of the stepped recess, a free end configured to extend from the fixed end and to be elastically deformable, and a stop protrusion formed to protrude from the free end toward the rotation head; and the engagement member may form stop slits by being spaced apart from the inner surface of the stepped recess.

The string adjusting device may further include: a first stop protrusion formed to protrude from an outside surface of the lower housing; and a second stop protrusion formed to protrude from an inner surface of the rotation unit, and to be caught on the first stop protrusion; and the first stop protrusion and the second stop protrusion may be rotatably coupled to each other by being caught on each other.

The first and second stop protrusions may be formed to have arc-shaped cross sections, and the most protruding portions of arcs may be formed at locations which are off-centered to sides based on centers of the stop protrusions.

The first and second stop protrusions may be formed to have arc-shaped cross sections, and the most protruding portions of arcs may be formed to be located at centers of the stop protrusions.

The string adjusting device may further include: a through hole configured to communicate with the lower housing, and to penetrate the base plate; and a stop protrusion formed to protrude from a circumference of an inner surface of the through hole, and to be selectively caught on an upper end of the rotation base.

The string adjusting device may further include: a through hole configured to communicate with the lower housing, and to penetrate the base plate; and a stop protrusion formed to be stepped along a circumference of an inner surface of the through hole, and to be selectively caught on an upper end of the rotation base.

The string adjusting device may further include: a first stop protrusion formed to protrude from an outside surface of the lower housing; and a second stop protrusion formed to protrude from an inner surface of the rotation unit, and to be caught on the first stop protrusion; a through hole configured to communicate with the lower housing, and to penetrate the base plate; and a stop protrusion formed to protrude from a circumference of an inner surface of the through hole, and to be selectively caught on an upper end of the rotation base; and, when an upper end of the first stop protrusion and a lower end of the second stop protrusion are located to come into contact with each other, the rotation base may be caught on the stop protrusion.

A guide portion may be formed to protrude from a circumference of the string insertion portion.

According to the present invention, the string adjusting device basically includes only two units, i.e., the rotation unit and the base unit, with the result that the string adjusting device can achieve: 1) a reduction in the number of parts, 2) the simplicity of a structure, 3) the ease of a production process and a reduction in manufacturing cost, and 4) an increase in the aesthetics of a mounting target product through a reduction in shape, particularly a reduction in thickness, thereby overcoming the problems of the preceding string adjusting device according to the conventional technology.

DETAILED DESCRIPTION

Figure 1:
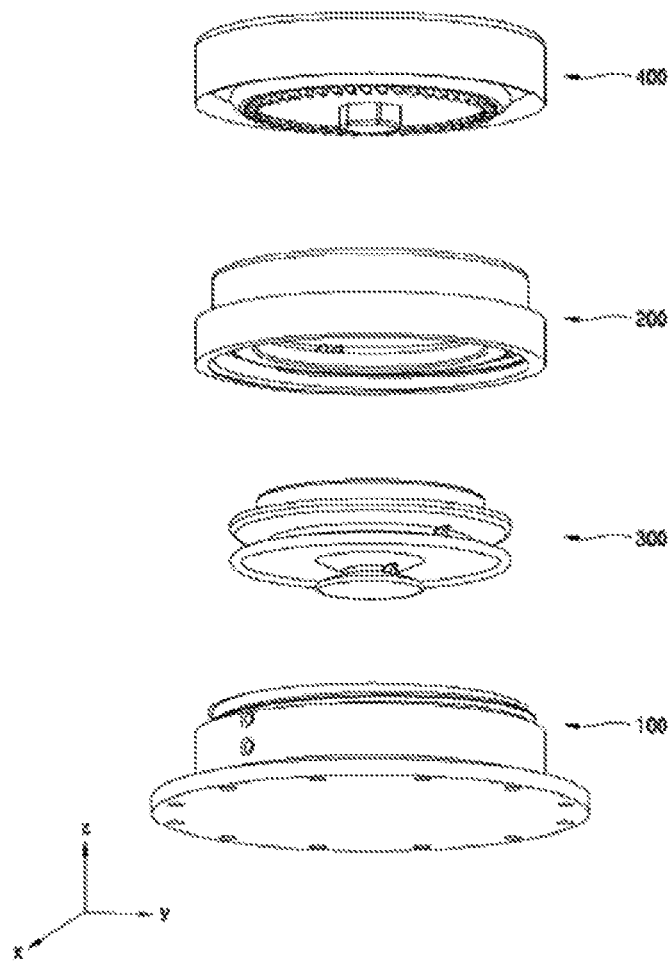
FIG. 1 is a view showing a configuration of a string adjusting device according to a conventional technology.

Embodiments of the present invention will be described in detail below with reference to the accompanying drawings so that those having ordinary knowledge in the art to which the present invention pertains can easily practice the present invention. The present invention may be implemented in various different forms, and are not limited to the embodiments described herein. Portions unrelated to the present invention will be omitted in the drawings in order to clearly describe the present invention, and the same reference symbols are used to designate identical or similar components throughout the drawings. Furthermore, detailed descriptions of well-known technologies will be omitted.

Throughout the present specification, the term "string" may be defined as referring to all types of objects which have a feature of having a significant difference between their length and their thickness or width and which also have a characteristic of being wound while being bent. Representative examples thereof may include a string, a wire, a rope, a band, etc. Accordingly, throughout the present specification, the term "string" has a wide meaning including all of the string, the wire, the rope, the band, etc.

Throughout the present specification, the term "user" may be defined as "every object having a body, which the string adjusting device of the present invention is worn on, i.e., connected to or attached to, and which also generates a causative operation or is subjected to the effect of the results of a causative operation and the operation of the string adjusting device." Accordingly, although a human, an animal, and a machine are described as important examples of the user herein, the user is not necessarily limited thereto. An artificial or natural object having an approximately predetermined shape, i.e., a thing, may be also included in the "user" of the present invention.

Throughout the specification, when a portion is described as "including" a component and unless specifically described to the contrary, the term does not means that the portion excludes another component, but means that the portion further includes another component.

Throughout the specification, when a portion is described as "being connected" to another portion, this includes not only a case of being "directly connected" but also a case of being connected with a third portion interposed therebetween.

Furthermore, throughout the present specification, the term "product" may be defined as an "artificially manufactured article wearable on a portion of the body of a user including a human, an animal, and a machine," and the term "string adjustable product" may be defined as an "artificially manufactured article equipped with the string adjusting device having the technical spirit described therein."

Furthermore, throughout the present specification, the term "being worn" may be regarded as including every state in which at least part of the string adjusting device of the present invention, product, or string adjustable product remains in contact with or is connected to and is not completely separated from "part of the body of a user including a human, an animal, a machine, and an object." For example, the term "being worn" includes a case where a portion of the string adjusting device of the present invention or product and a portion of a user remain in direct or indirect contact with each other or a case where a user and string adjusting device of the present invention remain in contact with each other without being completely separated from each other in a manner in which the user wears, winds, attaches, or holds the string adjusting device directly or through connection with another object.

Therefore, the term "being worn" includes a case where the string adjusting device of the present invention is attached to a portion of a user by means of a material, such as an adhesive, or a case where the string adjusting device is connected to a user by being coupled to a garment or cover.

Throughout the present specification, the term "band" is defined as including a "ring shape" in which one end and the other end are connected to each other and a "patch shape" in which one end and the other end are separated from each other.

Throughout the present specification, the term "shape or form" refers to a "shape defined by variables including length, width, height, area, volume, etc". Accordingly, "a change in shape" is defined as a change in at least one of the variables, such as length, height, etc, which are used to define the shape. Therefore, throughout the present specification, the extension, contraction, bending, bucking, etc. of the configuration of a component of the string adjusting device according to the present invention and the product defined above are included in the "change in shape."

Throughout the present specification, the term "movement" refers to "the movement of part or all of the string adjusting device from one location to another location in a space. Accordingly, this includes cases where the overall string adjusting device is decelerated and accelerated.

Throughout the present specification, the term "part" refers to an object which is a set of elements including unit elements adapted to be connected or coupled to each other and to form part of the string adjusting device of the present invention and which also has an independent shape. A base unit, a rotation unit, etc. which will be described in detail later may be representative examples thereof.

Throughout the present specification, the term "completely coupled state" refers to a state in which the individual portions of the string adjusting device of the present invention have been coupled to each other and are rotatable only in a direction in which a string is wound. Furthermore, the term "temporarily coupled state" refers to a state in which individual portions of the string adjusting device of the present invention are separated from each other but the overall string adjusting device maintain its shape and function as a single device, in which state the portions are rotatable in both in a direction in which a string is wound and a direction in which the string is unwound.

A configuration of a string adjusting device according to the present invention will be described in detail below with reference to the accompanying drawings.

First Embodiment

Figure 2:
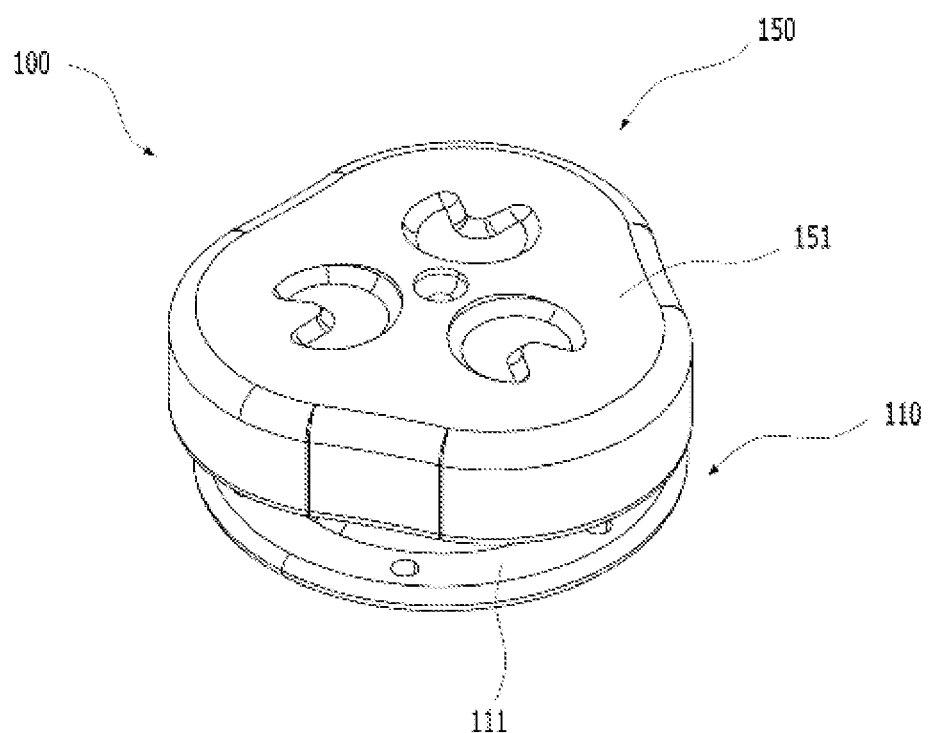
FIG. 2 is a view showing a configuration of a string adjusting device according to a first embodiment of the present invention.
Figure 3:
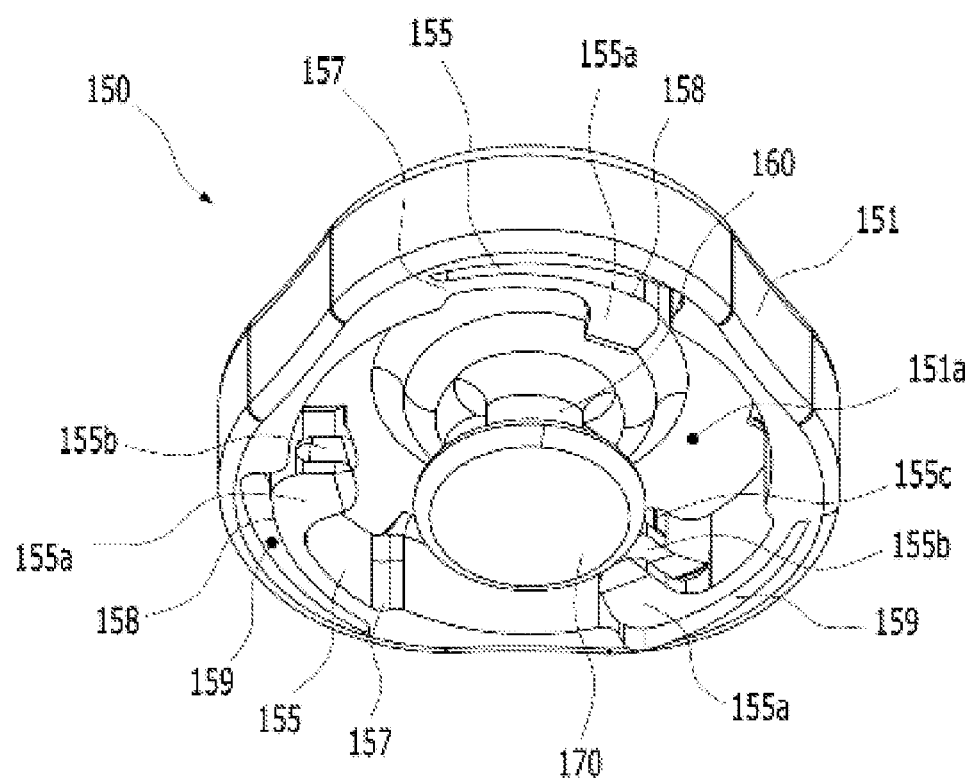
FIG. 3 is a view showing a configuration of a rotation unit constituting part of the first embodiment of the present invention.
Figure 4:
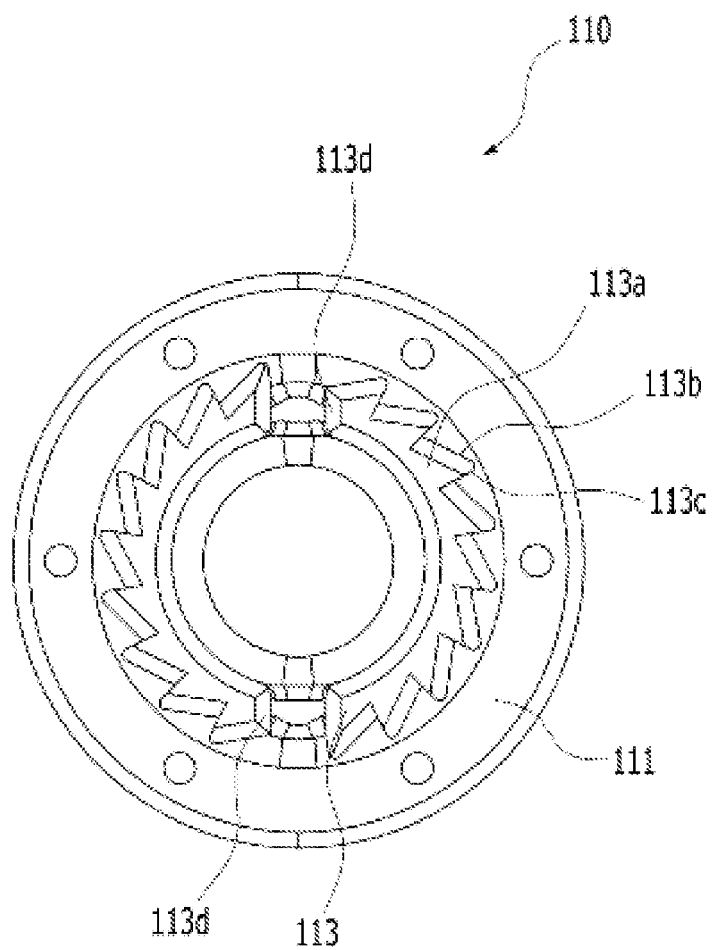
FIG. 4 is a view showing a configuration of a base unit constituting part of the first embodiment of the present invention.
Figure 5:
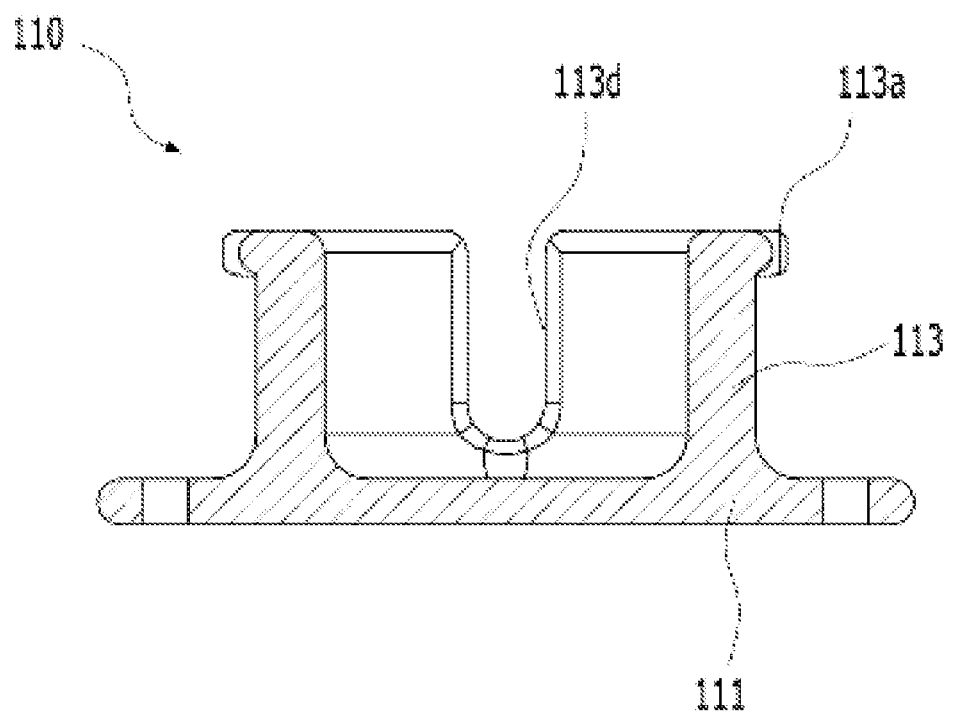
FIG. 5 is a sectional view showing the configuration of the base unit constituting part of the first embodiment of the present invention.
Figure 6:
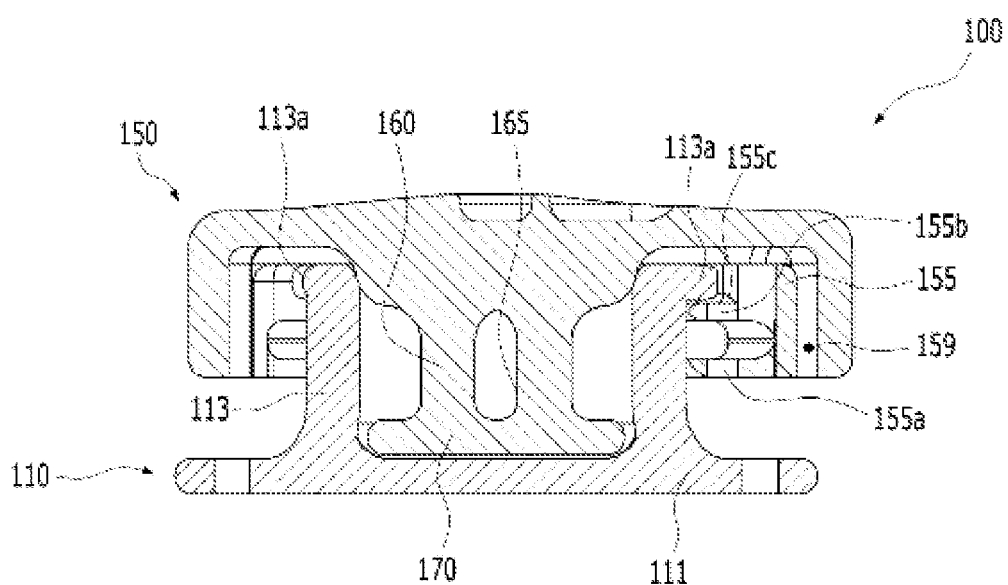
FIG. 6 is a vertical sectional view showing the configuration of the string adjusting device according to the first embodiment of the present invention.
Figure 7:
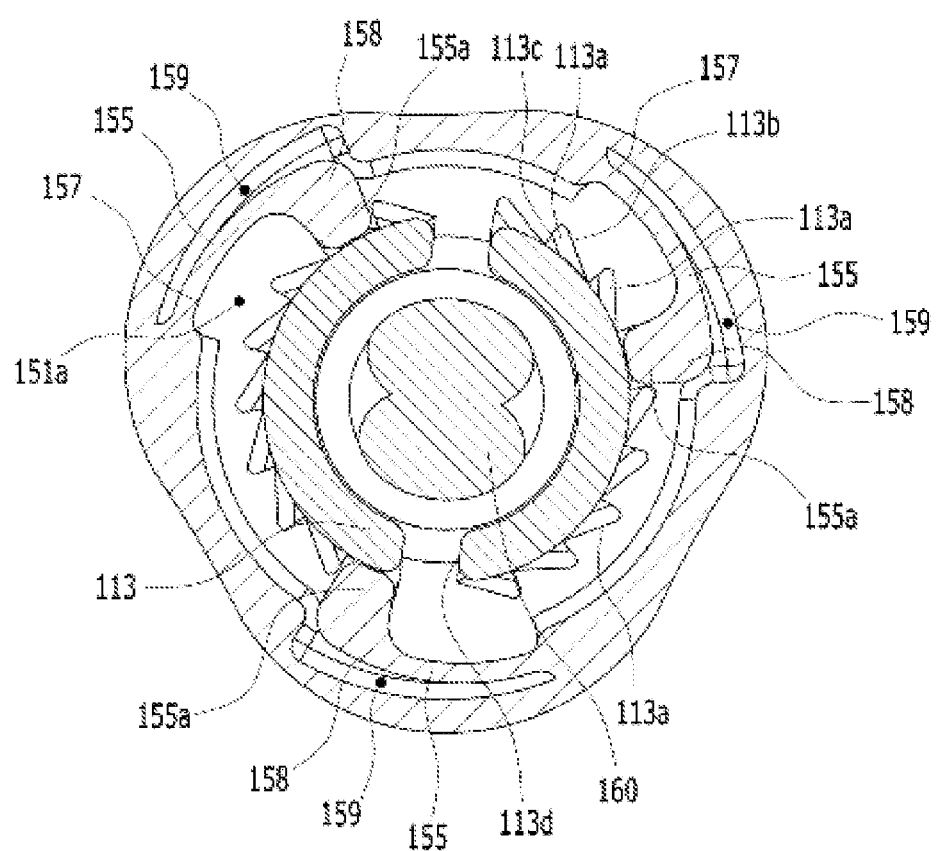
FIG. 7 is a horizontal sectional view showing the configuration of the string adjusting device according to the first embodiment of the present invention.

FIG. 2 is a view showing a configuration of a string adjusting device according to a first embodiment of the present invention, FIG. 3 is a view showing a configuration of a rotation unit constituting part of the first embodiment of the present invention, FIG. 4 is a view showing a configuration of a base unit constituting part of the first embodiment of the present invention, FIG. 5 is a sectional view showing the configuration of the base unit constituting part of the first embodiment of the present invention, FIG. 6 is a vertical sectional view showing the configuration of the string adjusting device according to the first embodiment of the present invention, and FIG. 7 is a horizontal sectional view showing the configuration of the string adjusting device according to the first embodiment of the present invention.

The string adjusting device according to the first embodiment of the present invention is now described with reference to FIGS. 2 to 7.

The string adjusting device 100 according to the first embodiment of the present invention may include: a base unit 110 including a base plate 111, a cylindrical lower housing 113 provided on the base plate 111, and stop protrusions 113a formed to protrude from the lower housing 113; and a rotation unit 150 including a bobbin 160 rotatably installed within the lower inner space of the housing 113 and configured such that a string is wound therearound, a rotation head 151 configured such that the bobbin 160 is installed thereon, and an engagement member 155 formed to be elastically deformed in the state in which one end thereof is fastened on one surface of the rotation head 151 and configured to be caught on the stop protrusions 113a. Although an example in which the location of the engagement member 155 caught on the stop protrusions 113a is directed from one surface of the rotation head 151 to the lower housing 113 is described herein, the present invention is not necessarily limited thereto, but may be applied to a surface which is not directed to the lower housing 113.

The base plate 111 has a plate shape. When necessary, part of the inside of the base plate 11 may be formed as an opening. The base plate 111 is a portion which forms part of the lower housing 113. Accordingly, it is advantageous to integrate the base plate 111 with the lower housing 113 upon actual mass production, and thus it is more accurate to consider the base plate 111 to be part of the lower housing 113 projecting from the lower housing 113 in reality.

As shown in one example of FIG. 4, the base unit 110 forms the center of rotation of the string adjusting device 100, and the plate-shaped base plate 111 and the lower housing 113 coupled to the base plate 111 are installed therein. The stop protrusions 113a are formed to protrude from the circumference of the outside surface of the lower housing 113.

As shown in the example of FIG. 4, the stop protrusions 113a are formed in the shape of a ratchet gear having a right-angled triangle-shaped section when viewed in a direction from the rotation head 151 to the base plate 111. This is merely an embodiment, and the stop protrusions 113a may be each formed to have one of various shapes, such as a polygonal shape, an arc shape, or a combination of a rectilinear line and a curve.

Each of the stop protrusions 113a may be formed to include: an inclined surface 113b configured such that the engagement member 155 comes into contact with and moves over it when the rotation head 151 is rotated; and a stop surface 113c configured to be caught on the engagement member 155 in order to prevent reverse rotation when the rotation head 151 tends to perform reverse rotation in the opposite direction.

The rotation head 151 is provided with: a rotation space 151a configured such that the stop protrusions 113a of the housing are located and rotated inside a space surrounded by the surface of the rotation head 151 in the state of being open toward the base unit 110 direction, i.e., the rotation space 151a to be described later; and the engagement member 155 configured to include a fixed end 157 configured such that one end thereof is fixed on a side surface of the rotation space 151a, and a free end 158 configured to be elastically deformed around the fixed end 157. The engagement member 155 is caught on the stop protrusions 113a. The rotation head 151 may include stop slits 159 which are formed by cutting out a portion between the engagement member 155 and the inner surface of the rotation space 151a in order to allow the engagement member 155 to be elastically deformed.

As shown in FIG. 3, the skeleton of the rotation unit 150 is formed by the rotation head 151. The rotation head 151 has a shape open in the direction of the base unit 110, and the rotation space 151a within which the stop protrusions 113a can be rotated is formed inside the rotation head 151.

The column-shaped bobbin 160 around which a string is wound protrudes from approximately the center of the rotation space 151a to a preset length, and a plate-shaped rotation base 170 which is rotatably installed inside the lower housing 113 is provided at one end of the column-shaped bobbin 160 directed toward the base plate 111.

The engagement member 155 is formed to have the fixed end 157 configured such that one end thereof is fixed onto the inside surface of the rotation space 151a and the free end 158 configured to extend from the fixed end 157, and is provided to be elastically deformed around the fixed end 157.

The stop slits 159 are formed between the engagement member 155 and the inside surface of the rotation space 151a. The stop slits 159 provides a space within which the engagement member 155 can be elastically deformed when it moves over the stop protrusions 113a of the lower housing 113.

Furthermore, the engagement member 155 may further include: a first stop projection 155a formed to protrude from the free end 158 toward the bobbin 160; a second stop projection 155b spaced apart from the first stop projection 155a by a preset distance in a direction away from the base plate 111 and formed to protrude from the free end 158 toward the bobbin 160; and an inclined portion 155c formed to be inclined from the second stop projection 155b, and configured to allow the stop protrusions 113a to come into contact with and move over the second stop projection 155b in a sliding manner when necessary.

The first and second stop protrusions 155a and 155b function to fasten the rotation unit 150 and the base unit 110 in order to prevent them from being separated from each other. In the state in which the rotation unit 150 and the base unit 110 have been completed coupled to each other, the stop protrusions 113a of the base unit 110 are caught on the second stop projection 155b. More accurately, the stop protrusions 113a is supported by and caught on the second stop projection 155b in a direction from the base plate 111 to the rotation head 151. In a completely coupled state, a string is gradually wound around the bobbin 160 in proportion to the rotation of the rotation head 151, and is not unwound.

When the rotation unit 150 and the base unit 110 are in a temporarily coupled state, the stop protrusions 113a are supported by and caught on the first stop projection 155a in the direction from the base plate 111 to the rotation head 151. In other words, the temporarily coupled state is a state in which the stop protrusions 113a are separated from the inclined portion 155c and released in the state of being located between the first stop projection 155a and the second stop projection 155b. In the temporarily coupled state, the rotation unit 150 can perform reverse rotation in the direction opposite to that of unidirectional rotation which is possible in the completely coupled state based on the base unit 110, and thus the string wound around the bobbin 160 can be unwound.

In the completely coupled state, the inclined portion 155c is formed on the second stop projection 155b to be inclined with respect to the front end of the second stop projection 155b. The inclined portion 155c comes into contact with the inclined surface 113b of the stop protrusions 113a, and guides the engagement member 155 so that the engagement member 155 can easily move over the stop protrusions 113a when the rotation unit 150 is rotated in a direction in which a string is wound.

In the completely coupled state, when the rotation head 151 is reversely rotated in a direction in which a string is unwound, an end of the inclined portion 155c of the second stop projection 155b in a direction away from the fixed end 157 is caught on the stop surface 113c of the stop protrusions 113a, thereby preventing reverse rotation.

As shown in FIG. 6, in the completely coupled state, i.e., in a state in which an operation of winding a string is possible, the rotation base 170 comes into complete contact with the bottom surface of the lower housing 113, and the stop protrusions 113a are supported by and caught on the second stop projection 155b. Meanwhile, in the temporarily coupled state, the stop protrusions 113a are inserted between the first stop projection 155a and the second stop projection 155b in a sandwiched form.

A string holding portion 165 into which a string is inserted may be formed to penetrate the bobbin 160. The bobbin 160 has at least one column shape. When the bobbin 160 has a single column shape, the string holding portion 165 may be formed to penetrate the bobbin 160 so that a string can be inserted thereinto, or may be formed in various shapes, such as a recess, a protrusion, and the like, so that a string is caught thereon.

When the bobbin 160 is composed of two or more columns, the string holding portion 165 may be formed by spacing the columns of the bobbin 160 apart from each other, may be formed to penetrate each of the columns, or may be formed in various shapes, such as a recess, a protrusion, and the like, so that a string is caught thereon.

String reception portions 113d may be formed to penetrate the lower housing 113 so that a string can enter into and exit from the lower housing 113. Although the string insertion portions 113d are formed in the shapes of slits open to the top thereof in the present embodiment, they may be formed in the shapes of apertures or holes closed to the top thereof.

When the string is installed, the string is inserted through the reception portion 113d, is caught in the string holding portion 165, is passed through the opposite string insertion portion 113d, and is then moved to the outside.

Although the two string insertion portions 113d are formed through opposite surface portions of the lower housing 113 in the present embodiment, a single string insertion portion 113d may be formed. In other words, the string may be inserted into the string insertion portion 113d, may be caught in the string holding portion 165, and may be returned through the same string insertion portion 113d. Accordingly, it is sufficient if at least one string insertion portion 113d is provided.

In the completely coupled state, a length is adjusted as the center portion of the string is wound around the bobbin 160 in response to rotation in one direction based on the base unit 110 of the rotation unit 150.

In this case, the tension applied to the string when the string is wound around the bobbin may be also measured. For example, when sensors (not shown) configured such that electrical resistance varies in proportion to an increase or decrease in the length of an object, such as strain gauges (not shown), are attached onto the string or engagement member 155 and are also connected to an electric/electronic circuit (not shown) configured to read and transfer signals, such as a Wheatstone bridge circuit, an increase or decrease in length on the string or engagement member 155 may be converted into and expressed as a change in an electrical signal.

The sensors capable of measuring an increase and a decrease in the length of the string or engagement member 155 or a minute change in the shape of a portion inside the string adjusting device 100 resulting from the increase or decrease include various devices, such as strain gauges, capacitance sensors, inductance sensors, magnetic field sensors, elastomers (not shown), etc. This may be applied to all the embodiments of the string adjusting device according to the present invention.

A method of manipulating the string adjusting device 100 according to the first embodiment of the present invention is described below in detail with reference to the example of the string adjusting device 100 disclosed in FIGS. 2 to 7.

First, a user installs a string by catching the string in the string holding portion 165 formed in the bobbin 160 of the rotation unit 150. In this state, the user couples the rotation unit 150 and the base unit 110 to each other so that rotation base 170 of the rotation unit 150 can be inserted into the lower housing 113 of the base unit 110. In this case, the string is aligned and then inserted such that the string can be passed through the string insertion portion 113*d* of the base unit 110. Alternatively, the string holding portion 165 of the bobbin 160 and the string insertion portion 113*d* may be aligned with each other first, and then the string may be pushed into the string insertion portion 113*d* from the outside of the base unit 110.

During this process, the first stop projection 155*a* of the engagement member 155 comes into contact with the stop protrusions 113*a* of the lower housing 113. In this case, the user pushes the rotation unit 150 while overcoming the elastic force of the engagement member 155. The engagement member 155 is elastically deformed, and thus the first stop projection 155*a* moves over the stop protrusions 113*a*. In this case, the surface of the first stop projection 155*a* where the first stop projection 155*a* meets the stop protrusions 113*a* are inclined, and thus the first stop projection 155*a* can easily move over the stop protrusions 113*a*.

This state is a temporarily coupled state, and the stop protrusions 113*a* are located between the first and second stop projections 155*a* and 155*b*.

When force is applied such that the rotation unit 150 and the base unit 110 are separated from each other in the temporarily coupled state, the surface of the first stop projection 155*a* which comes into contact with the lower end of the stop protrusions 113*a* is formed to be horizontally caught on the stop protrusions 113*a*, thereby performing control so that the rotation unit 150 is prevented from being separated from the base unit 110.

In the temporarily coupled state, the rotation unit 150 is rotatable in both directions, i.e., a direction in which a string is wound and a direction in which the string is unwound.

In the temporarily coupled state, when a user further inserts the rotation unit 150 in the direction of the base plate 111, the stop protrusions 113*a* move over the second stop projection 155*b*, and the stop protrusions 113*a* are caught on the inclined portion 155*c*. In greater detail, the stop surface 113*c* of the stop protrusions 113*a* is caught on the second stop projection 155*b*, and thus enters into a completely coupled state. In this state, the rotation unit 150 is rotatable only in one direction, i.e., a direction in which a string is wound.

The rotation process of the rotation unit 150 is now described. When a user rotates the rotation head 151 in a direction in which a string is wound while holding the rotation head 151, the inclined surfaces 113*b* of the stop protrusions 113*a* opposite to the inclined portion 155*c* of the second stop projection 155*b* come into contact with each other. As the inclined portion 155*c* moves over the inclined surface 113*b*, the engagement member 155 is rotated in the direction of the stop slits 159 while being elastically deformed.

When the inclined portion 155*c* moves out of the inclined surface 113*b*, the stop surface 113*c* of the stop protrusions 113*a* is caught on the other side surface (not shown) of the inclined portion 155*c* and is subjected to resistance against movement, thereby preventing the rotation unit 150 from performing rotation in the opposite direction and also fixing the location of the rotation unit 150.

In the completely coupled state, when the rotation unit 150 is continuously rotated in a direction in which a string is wound, the above-described operation is repeated. Accordingly, as the string is gradually wound around the bobbin 160, the length of the string outside the string adjusting device 100 is adjusted.

In order not to further wind the wound string and to unwind the string, the rotation unit 150 can be freely rotated in the direction in which the string is wound and in the opposite direction based on the base unit 110. This state is defined as the temporarily coupled state. When the user pulls the rotation head 151 in a direction away from the base plate 111 while holding the rotation head 151 of the string adjusting device 100 in the completely coupled state, the rotation head 151 is switched to the temporarily coupled state. According to this operation principle, in the completely coupled state in which the stop surface 113*c* of the stop protrusions 113*a* and one side surface of the inclined portion 155*c* of the engagement member 155 meet each other and resist movement while exchanging forces, they are separated from each other and thus the resistance is eliminated. In the completely coupled state, the stop protrusions 113*a* is supported by and caught on the second stop projection 155*b*. In the temporarily coupled state, the stop protrusions 113*a* move over the second stop projection 155*b*, and are disposed between the first stop projection 155*a* and the second stop projection 155*b*. In this case, the stop protrusions 113*a* are supported by and caught on the first stop projection 155*a*.

Figure 21:
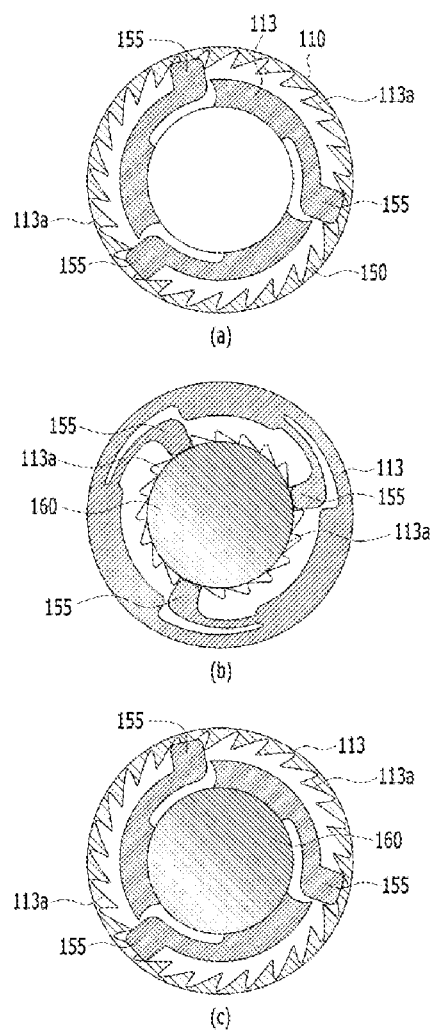
FIG. 21 is a view showing a configuration of an embodiment based on the interchange of the locations of stop protrusions and an engagement member in a string adjusting device according to an embodiment of the present invention.

Referring to FIG. 21, the locations of the stop protrusions 113*a* and the engagement member 155 are interchangeable. In other words, the stop protrusions 113*a* may be formed on the rotation unit 150, and the engagement member 155 may be formed on the lower housing 113. It will be apparent to those skilled in the art that even when the locations are interchanged with each other, there is no influence on an operation principle (see FIG. 21(*a*)).

Furthermore, it may be possible that the stop protrusions 113*a* are formed inside the lower housing 113 and the engagement member 155 is formed on the bobbin (see FIG. 21(*c*)) or that the stop protrusions 113*a* are formed along the circumference of the bobbin and the engagement member 155 is formed on the lower housing 113 (see FIG. 21(*b*)). In these cases, the stop protrusions 113*a* and the engagement member 155 are located inside the lower housing 113, and thus the radius of the lower housing 113 needs to be formed to be relatively long.

Furthermore, although the case where the location at which the stop protrusions 113*a* and the engagement member 155 come into contact with each other corresponds to the upper end portion of the lower housing 113 is taken as an example in the present embodiment, the location may be set to various locations, such as the center, lower end and the like of the lower housing 113, as desired.

So far, the first embodiment of the present invention has been described. The principal features thereof reside in that three functions, i.e., a function of preventing reverse rotation in a direction in which a string is unwound in a completely coupled state, a function of switching between a completely coupled state and a temporarily coupled state, and a function of preventing the rotation unit 150 from being separated from the base unit 110 in a temporarily coupled state, are all accomplished through the engagement relationships between the stop protrusions 113*a* and the engagement member 155.

Figure 20:
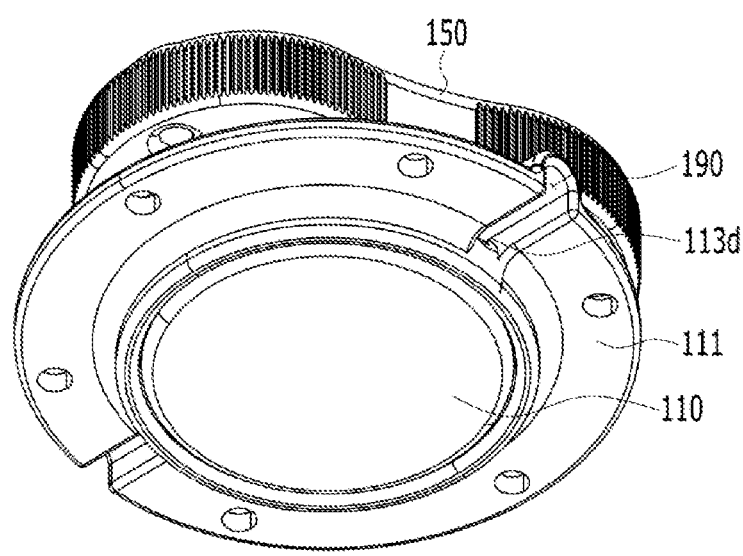
FIG. 20 is a view showing a configuration of a guide portion constituting part of an embodiment of the present invention.

Referring to FIG. 20, a guide portion 190 may be formed to protrude from the circumference of the string insertion portion 113*d*. The guide portion 190 is configured to surround a portion corresponding to the entrance of the string insertion portion 113*d*. Although the guide portion 190 is formed by bending part of the base plate 111 in FIG. 20, the guide portion 190 may be formed to be separate.

The guide portion 190 functions to prevent a coupled state from being released due to vibration when the string comes into the rotation unit 150 and the base unit 110 while moving laterally when the string adjusting device 100 is in use.

In contrast, the second and third embodiments of the present invention will be described with a focus on differences in feature: in which 1) a function of preventing reverse rotation in a direction in which a string is unwound in a completely coupled state is implemented by the engagement relationships between engagement members 220 and 320 and stop protrusions 253 and 353, and 2) a function of switching between a completely coupled state and a temporarily coupled state and 3) a function of preventing a rotation unit 250 or 350 and a base unit 210 or 310 from being separated from each other in a temporarily coupled state are implemented by the engagement relationships between the fastening protrusion 270a of a rotation base 270 and first and second fastening protrusions 215a and 215b (a second embodiment), or by the engagement relationships between the first stop protrusion 340 of a lower housing and the second stop protrusion 343 of a rotation unit and the engagement relationships between a rotation base 370 and a stop protrusion 311b (a third embodiment) below.

Second Embodiment

A configuration of a string adjusting device 200 according to a second embodiment of the present invention is now described in detail below with reference to drawings. In this case, configurations, functions, and operation methods identical to those of the first embodiment of the present invention are not repetitively described, and configurations, functions, and operation methods different from those of the first embodiment of the present invention are mainly described.

The string adjusting device 200 according to the second embodiment of the present invention is different from that of the first embodiment in 1) the locations and directions of stop protrusions 253 and an engagement member 220, and 2) the engagement relationships between the fastening protrusion 270a of a rotation base 270 and first and second fastening protrusions 215 and 216. The following description is focused on the differences.

Figure 8:
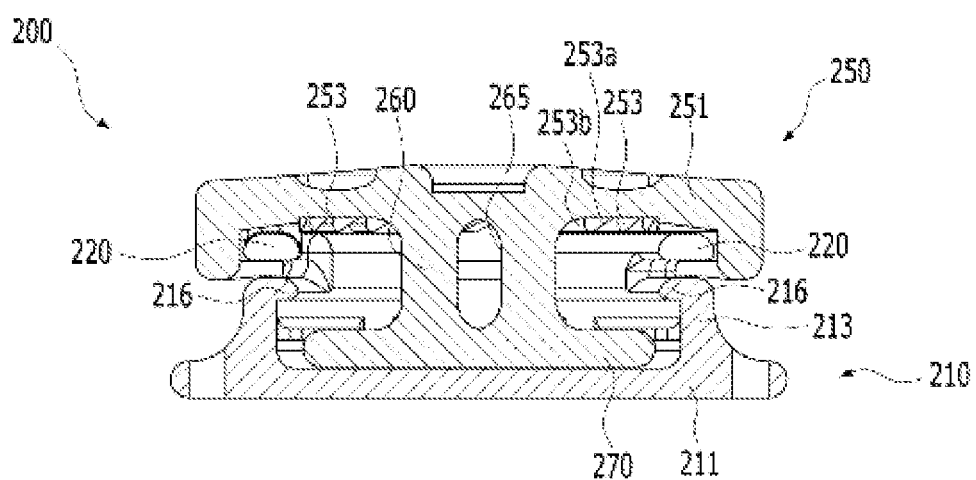
FIG. 8 is a sectional view showing a configuration of a string adjusting device according to a second embodiment of the present invention.
Figure 9:
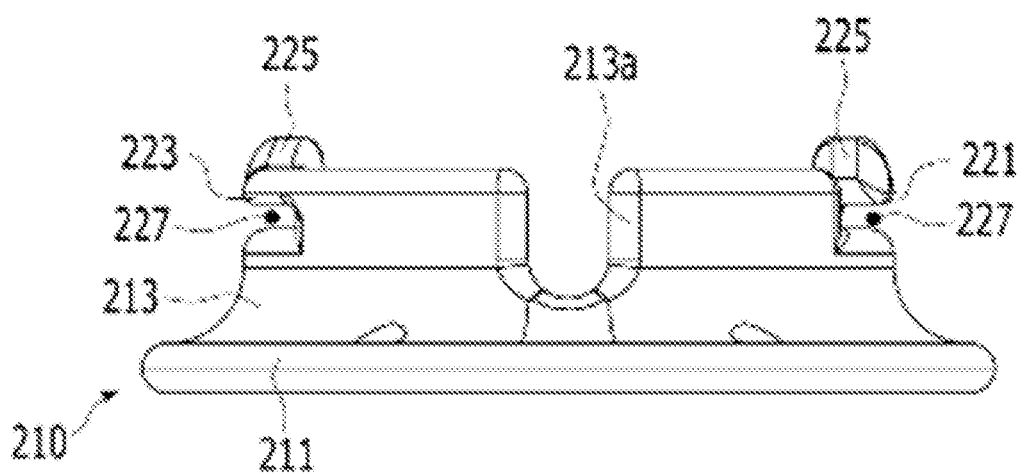
FIG. 9 is a view showing a configuration of a base unit constituting part of the second embodiment of the present invention.
Figure 10:
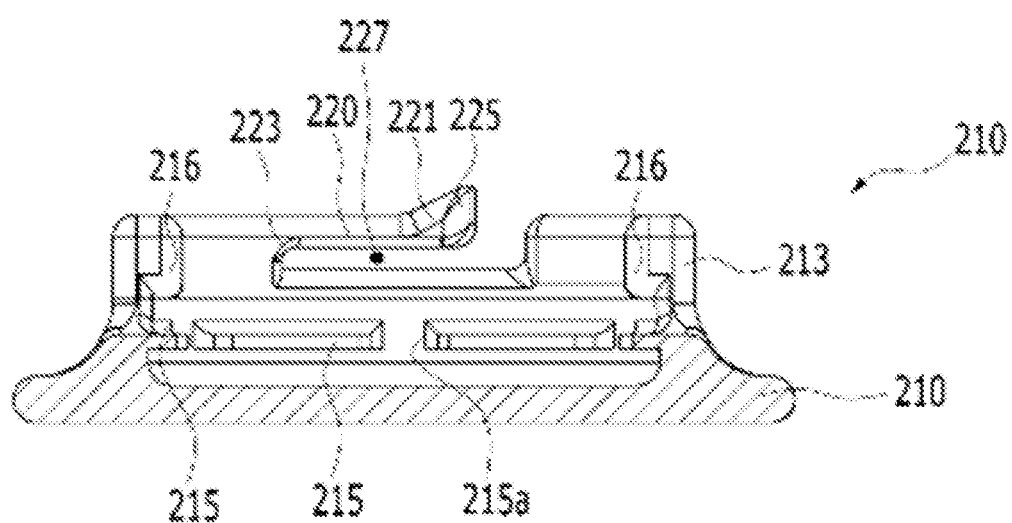
FIG. 10 is a sectional view showing the configuration of the base unit constituting part of the second embodiment of the present invention.
Figure 11:
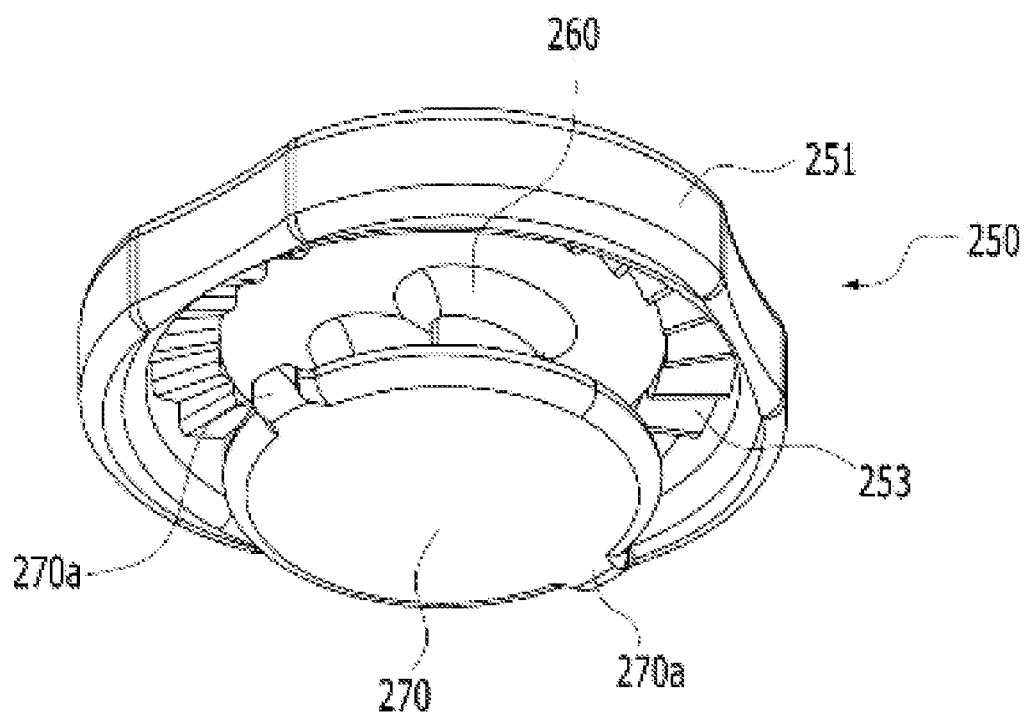
FIG. 11 is a view showing a configuration of a rotation unit constituting part of the second embodiment of the present invention.

FIG. 8 is a sectional view showing the configuration of the string adjusting device according to the second embodiment of the present invention, FIG. 9 is a view showing a configuration of a base unit constituting part of the second embodiment of the present invention, FIG. 10 is a view showing a configuration of a rotation unit constituting part of the second embodiment of the present invention, and FIG. 11 is a sectional view showing the configuration of the rotation unit constituting part of the second embodiment.

The string adjusting device 200 according to the second embodiment of the present invention may include: a base unit 210 including a base plate 211, a cylindrical lower housing 213 configured to be open in at least one direction, and an engagement member 220 provided to be elastically deformable based on a fixed one end of the lower housing 213; and a rotation unit 250 including a bobbin 260 installed such that at least part thereof is rotatable inside the lower housing 213 and configured such that a string is wound around the outside surface thereof, a rotation head 251 configured such that the bobbin 260 is installed at approximately the center thereof, and stop protrusions 253 formed on one surface of the rotation head 251 to face the engagement member 220 along a trajectory where the engagement member 220 is located when the rotation head 251 is rotated.

The string adjusting device 200 according to the second embodiment may be configured such that the engagement member 220 is formed on the lower housing 213 and the stop protrusions 253 are installed on one surface of the rotation unit 250. Although not shown in the drawings, it may be possible that the stop protrusions 253 are formed on the lower housing 213 and the engagement member 220 is formed on the rotation head 251, like in the preceding first embodiment.

The base plate 211 may be formed as a single plate shape, or may be formed to protrude from the circumference of the outside surface of the lower housing 213, other than a single plate.

The engagement member 220 may be configured to include a fixed end 223 connected to the lower housing 213, a free end 221 configured to extend from the fixed end 223 and to be elastically deformable, a stop projection 225 formed at the free end 221 and formed to protrude toward the rotation head 251. In order to allow the elastic deformation of the engagement member 220, a stop slit 227 is formed by cutting out a portion between the free end 221 of the engagement member 220 and the lower housing 213. In the drawing, an end of the engagement member 220 directed toward the rotation head 251 of the lower housing 213 is disclosed as an example of the one portion.

The engagement member 220 is formed by cutting out part of the front end of the lower housing 213, and is formed such that the free end 221 is elastically deformable in the direction of the rotation head 251 based on the fixed end 223. The stop slit 227 is formed to penetrate between the engagement member 220 and the lower housing 213, and provides an additional space in which the engagement member 220 is deformable in an additional direction.

The stop protrusions 253 are formed on the rotation unit 250, accurately the inner lower surface of the rotation head 251, i.e., one surface in the direction of the base unit 210, so as to face the engagement member 220 along a trajectory where the engagement member 220 is located when the rotation unit 250 is rotated. Each of the stop protrusions 253 includes: an inclined surface 253b configured to be met in a manner of moving over the engagement member 220 when the rotation head 251 is rotated in a direction in which a string is wound in a completely coupled state; and a stop surface 253c configured to be met in a manner in which the engagement member 220 is caught and cannot move when the rotation head 251 is rotated in a direction in which the string is unwound.

Accordingly, control is formed such that the rotation direction of the rotation unit 250 performs functions required for a completely coupled state or temporarily coupled state while the engagement member 220 is moving over or cannot move over the stop protrusions 253.

The string adjusting device 200 according to the present invention may further include: a first fastening protrusion 215 formed to protrude from the circumference of the inner surface of the lower housing 213; a second fastening protrusion 216 spaced apart from the first fastening protrusion 215 by a predetermined distance, and formed to protrude in parallel with the first fastening protrusion 215; a rotation base 270 formed in the shape of a plate, coupled to one end in a direction away from the bobbin 260 to the rotation head 251, and located inside the lower housing 213; and a fastening protrusion 270a formed to protrude from an end of the rotation base 270, and configured to be caught on the first fastening protrusion 215 in a completely coupled state and to be caught between the first fastening protrusion 215 and the second fastening protrusion 216 in a temporarily coupled state.

In other words, while the fastening protrusion 270a formed to protrude from the end of the rotation base 270 is being caught on the first fastening protrusion 215, a state in which the rotation unit 250 has been completely coupled to the base unit 210 is maintained. Furthermore, while the fastening protrusion 270a is being caught between the first fastening protrusion 215 and the second fastening protrusion 216, a state in which the rotation unit 250 has been temporarily coupled to the base unit 210 is maintained.

An insertion recess 215a is formed by cutting out part of the first fastening protrusion 215. The fastening protrusion 270a may be passed through the insertion recess 215a, and may be caught on the first fastening protrusion 215. In a completely coupled case, the fastening protrusion 270a needs to be caught on the lower end of the first fastening protrusion 215. For this purpose, the fastening protrusion 270a is enabled to pass through the insertion recess 215a.

An insertion recess may be formed in the second fastening protrusion 216, as in the first fastening protrusion 215.

In a temporarily coupled case, the fastening protrusion 270a is inserted between the upper portion of the first fastening protrusion 215 and the lower portion of the second fastening protrusion 215b, as in a sandwich. The second fastening protrusion 216 is located closer in the direction of the rotation head 251 approximately than an end location in the direction of the base plate 211 of the string insertion portion 213b by the thickness of the fastening protrusion 270a, and is provided along the circumference of the inner surface of the lower housing 213. Accordingly, an advantage arises in that the string insertion portion 213a performs the same function as the insertion recess 215a in the first fastening protrusion 215.

Furthermore, tension applied to a string when the string is wound around the bobbin 260 may be measured. For example, when sensors (not shown) configured such that electrical resistance varies in proportion to an increase or decrease in the length of an object, such as strain gauges (not shown), are attached onto the string or engagement member 220 and are also connected to an electric/electronic circuit (not shown) configured to read and transfer signals, such as a Wheatstone bridge circuit, an increase or decrease in length on the string or engagement member 220 may be converted into and expressed as a change in an electrical signal. The sensors capable of measuring an increase and a decrease in the length of the string or engagement member 220 or a minute change in the shape of a portion inside the string adjusting device 200 resulting from the increase or decrease include various devices, such as strain gauges, capacitance sensors, inductance sensors, magnetic field sensors, elastomers (not shown), etc. This feature may be applied to all the embodiments described throughout the overall specification in the same manner.

An operation process of the string adjusting device 200 according to the second embodiment of the present invention will be described in detail below.

First, a user connects a string to a string holding portion 265 formed in the bobbin 260 of the rotation unit 250, aligns the rotation head 251 so that the string can pass through the string insertion portion 213a of the base unit 210, and couples the rotation unit 250 to the base unit 210 by pushing the rotation unit 250 into the base unit 210.

In this case, alignment and coupling are performed such that the fastening protrusion 270a of the rotation unit 250 can pass through the string insertion portion 213a of the base unit 210. When the rotation unit 250 is coupled to the base unit 210, the fastening protrusion 270a is aligned with and inserted into the open entrance of the string insertion portion 213a, is rotated in an azimuthal direction when reaching a location near an end opposite to the entrance of the string insertion portion 213a, and is located between the first fastening protrusion 215 and the second fastening protrusion 216, thereby entering into a temporarily coupled state. Thereafter, when the fastening protrusion 270a is additionally rotated in an azimuthal direction and aligned with the string insertion recess 215c, a completely coupled state is reached by additionally pushing the rotation unit 250 in the direction of the base plate 211.

Once the rotation unit 250 and the base unit 210 have been completely coupled to each other, the engagement member 220 is caught on the stop protrusions 253. In this state, when the rotation unit 250 is rotated, the fastening protrusion 270a is supported by the lower end portion of the first fastening protrusion 215, and can be rotated only in a direction in which a string is wound.

Meanwhile, in the temporarily coupled state in which the fastening protrusion 270a is disposed between the first fastening protrusion 215 and the second fastening protrusion 215b, movement in a rotation axis direction is restricted such that the rotation unit 250 is not separated from the base unit 210 and the engagement member 220 and the stop protrusions 253 do not meet each other, and thus the rotation unit is freely rotatable in both directions, i.e., a direction in which a string is wound and a direction in which the string is unwound.

In this temporarily coupled state, when the fastening protrusion 270a is aligned to be located at the string insertion portion 213a and is pulled in the direction of the rotation head 251, the rotation unit 250 can be separated from the base unit 210.

The second embodiment illustrates, in detail, an arrangement in which the engagement member 220 of the lower housing 213 and the stop protrusions 253 of the rotation unit 250 are disposed on surfaces having different locations along the rotation axis of the rotation head 251 and face each other.

However, the engagement member 220 and the stop protrusions 253 may be disposed to interchange their locations while facing each other. For example, the lower housing 213 is provided with the stop protrusions 253, and the rotation unit 250 is provided with the engagement member 220. Accordingly, even when they face each other, the operation principle, operation method and operation results of the device are the same.

Figure 19:
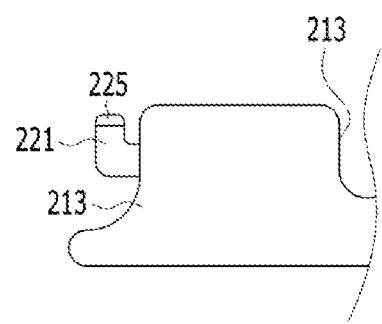
FIG. 19 is a view showing another embodiment of the engagement member in the string adjusting device according to the second embodiment of the present invention.
Figure 19:
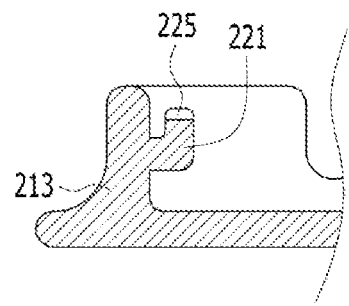

Furthermore, although the location of the engagement member 220 has been described as being the front end of the lower housing 213 in the above description of the second embodiment of the present invention, the engagement member 220 may be provided on the outside surface of the lower housing 213 (see FIG. 19(a), or may be provided on the inner surface of the lower housing 213 (see FIG. 19(b)).

Various embodiments may be present depending on whether the engagement member 220 and the stop protrusions 253 are disposed on the rotation unit 250 or base unit 210, whether the meeting location is disposed on the outer wall or inner wall of the lower housing 213 or near an end directed toward the rotation head 251. It will be understood that the operation principle, operation method and operation results of these various embodiments are the same as the second embodiment of the present invention already described in detail as long as the engagement member 220 and the stop protrusions 253 are arranged to face each other.

In other words, although an example in which the stop protrusions 253 and the engagement member 220 are arranged and configured to meet each other at the front end of the lower housing 213 has been described in the above description, the stop protrusions 253 and the engagement member 220 may be arranged and configured to meet each other at any location along the length of the cylinder, such as the outer wall or inner side wall of the cylinder of the lower housing 213, other than the end.

So far, the second embodiment of the present invention has been described. It will be understood that the second embodiment of the present invention is different from the first embodiment of the present invention in feature in that 1) a function of preventing reverse rotation in a direction in which a string is unwound in a completely coupled state is accomplished by the engagement between the engagement member 220 and the stop protrusions 253; and 2) a function of switching between a completely coupled state and a temporarily coupled state and 3) a function of preventing the rotation unit 250 from being separated from the base unit 210 in a temporarily coupled state are implemented by the engagement between the fastening protrusion 270a of the rotation base 270 and the first and second fastening protrusions 215a and 215b.

Third Embodiment

A configuration of a string adjusting device 300 according to a third embodiment of the present invention is described in detail below with reference to FIGS. 12 to 17. In this case, configurations, functions and operation methods identical to those of the first and second embodiments of the present invention are not repetitively described, and configurations, functions and operation methods different from those of the first and second embodiments of the present invention are mainly described.

Figure 12:
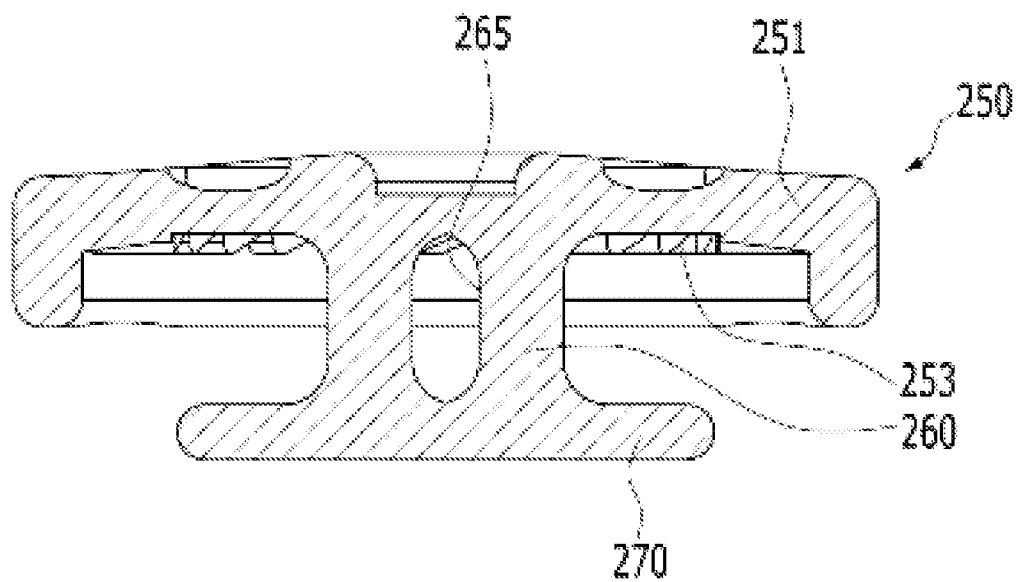
FIG. 12 is a sectional view showing the configuration of the rotation unit constituting part of the second embodiment.
Figure 13:
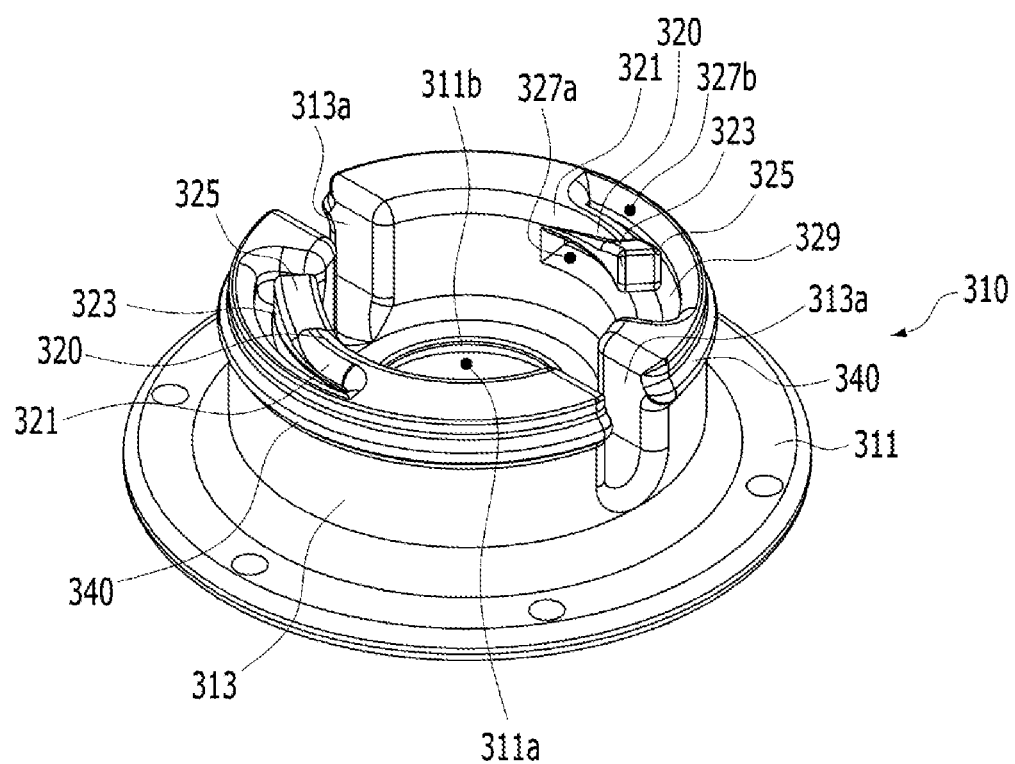
FIG. 13 is a view showing a configuration of a base unit constituting part of the third embodiment of the present invention.
Figure 14:
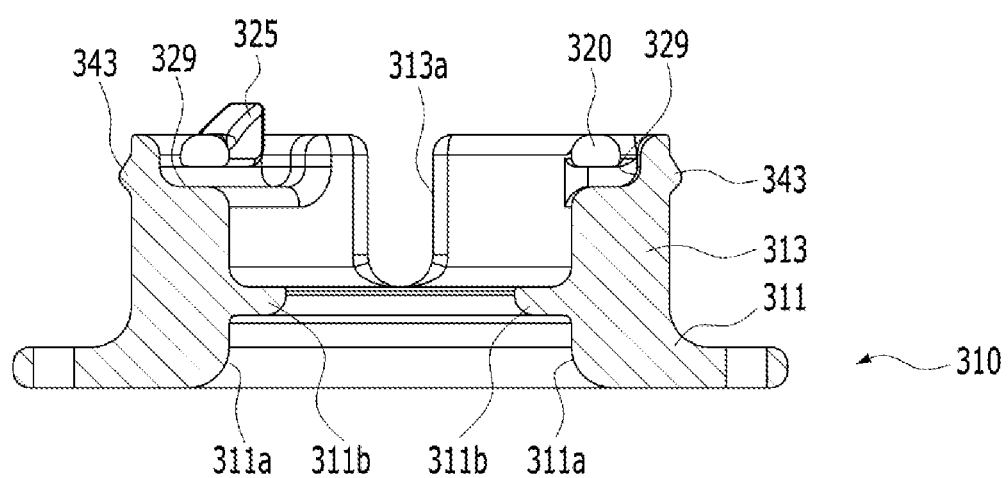
FIG. 14 is a sectional view showing the configuration of the base unit constituting part of the third embodiment of the present invention.
Figure 15:
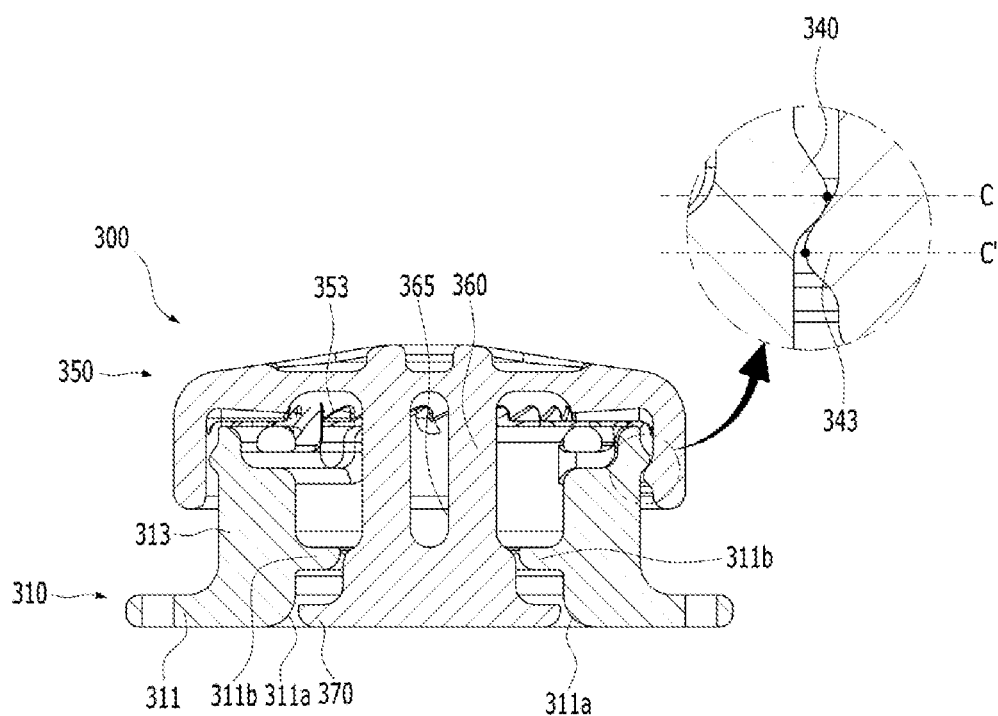
FIG. 15 is a sectional view showing a configuration of a string adjusting device according to the third embodiment of the present invention.
Figure 16:
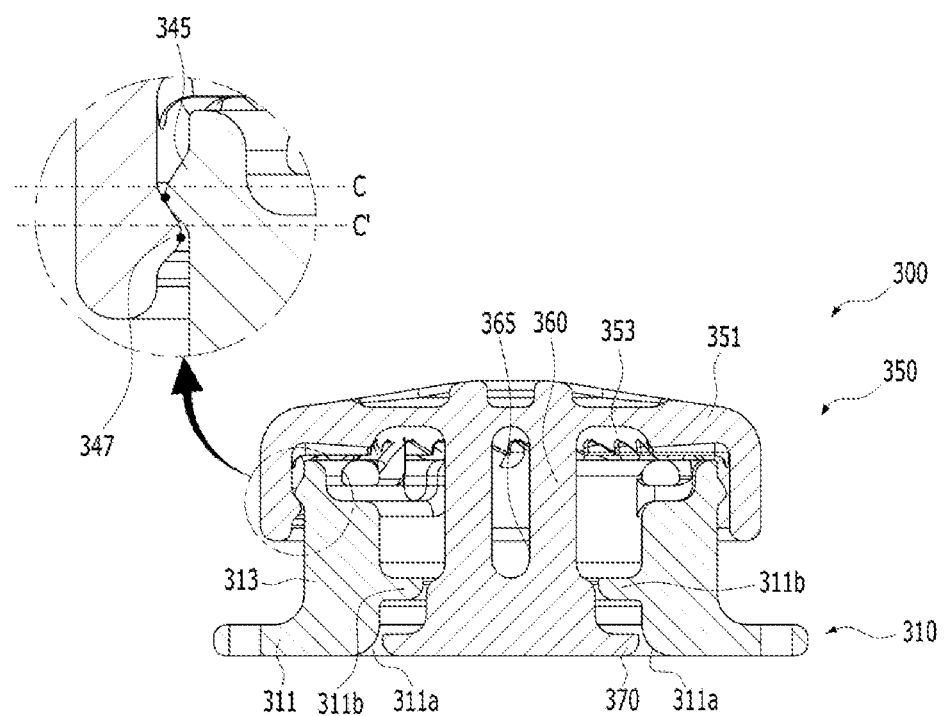
FIG. 16 is a sectional view showing an operation of the string adjusting device according to the third embodiment of the present invention.
Figure 17:
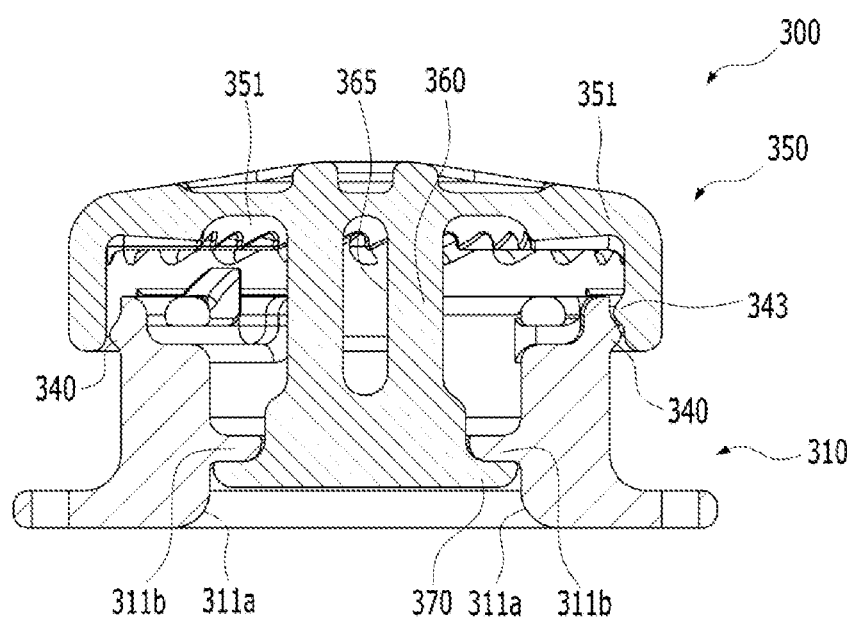
FIG. 17 is a sectional view showing the configuration of the string adjusting device according to the third embodiment of the present invention.

FIG. 12 is a sectional view showing a configuration of a rotation unit constituting part of a third embodiment of the present invention, FIG. 13 is a view showing a configuration of a base unit constituting part of the third embodiment of the present invention, FIG. 14 is a sectional view showing the configuration of the base unit constituting part of the third embodiment of the present invention, FIG. 15 is a sectional view showing a configuration of the string adjusting device according to the third embodiment of the present invention, FIG. 16 is a sectional view showing a configuration and an operation when the string adjusting device according to the third embodiment of the present invention is in a completely coupled state, and FIG. 17 is a sectional view showing a configuration and an operation when the string adjusting device according to the third embodiment of the present invention is in a temporarily coupled state.

The string adjusting device according to the third embodiment of the present invention may include: a base unit 310 including a cylindrical lower housing 313 configured to include a base plate 311 and to be open in at least one direction, and an engagement member 320 provided to be elastically deformable based on one end connected to the lower housing 313; and a rotation unit 350 including a bobbin 360 installed such that at least part thereof is rotatable inside the lower housing 313 and a string is wound around the outside surface thereof, a rotation head 351 configured such that the bobbin 360 is installed at approximately the center thereof, and stop protrusions 353 formed on one surface of the rotation head 351 directed toward the base unit 310 along a trajectory where the engagement member 320 is located when the rotation head 351 is rotated.

As shown in FIG. 13, according to the third embodiment of the present invention, the configuration of the engagement member 320 is partially different from that of the second embodiment. According to the third embodiment, there may be included: a stepped recess 329 formed on the inner surface of the lower housing 313; and the engagement member 320 configured to include a fixed end 321 coupled to the stepped recess 329, a free end 323 configured to extend from the fixed end 321 and to be elastically deformable, and a stop projection 325 formed from the free end 323 to the stop protrusions 353. The engagement member 320 may be spaced apart from the inner surface of the stepped recess 329, and may form stop slits 327a and 327b.

As in the present embodiment, the base plate 311 may be formed to have a plate shape, or may be formed to protrude from the circumference of the outside surface of the lower housing 313.

Furthermore, tension applied to a string (not shown) when the string is wound around the bobbin 360 may be measured. For example, when sensors (not shown) configured such that electrical resistance varies in proportion to an increase or decrease in the length of an object, such as strain gauges (not shown), are attached onto the string or engagement member 220 and are also connected to an electric/electronic circuit (not shown) configured to read and transfer signals, such as a Wheatstone bridge circuit, an increase or decrease in length on the string or engagement member 320 may be converted into and expressed as a change in an electrical signal. The sensors capable of measuring an increase and a decrease in the length of the string or engagement member 320 or a minute change in the shape of a portion inside the string adjusting device 300 resulting from the increase or decrease include various devices, such as strain gauges, capacitance sensors, inductance sensors, magnetic field sensors, elastomers (not shown), etc. This feature may be applied to all the embodiments described throughout the overall specification in the same manner.

Although the stop slits 227 are formed to penetrate the lower housing 213 in the second embodiment, the engagement member 320 is formed such that the stop slits 327a and 327b are formed throughout the engagement member 320 and are formed not to penetrate the side wall of the lower housing 313 in the third embodiment. In other words, a cantilever shape in which the engagement member 320 is coupled to one side surface of the stepped recess 329 is formed.

However, the stepped recess 329 is formed because a portion of the outer wall of the cylinder of the lower housing 313 is present, the portion of the outer wall prevents the operation of the engagement member 320 from being visible to a user from the outside, and there is an element for promoting the aesthetics of the overall device. However, there is no influence on the function of the engagement member 320. Accordingly, the portion of the corresponding outer wall does not need to be provided. In this case, the stop slits 327a and 327b may be formed to be penetrated or to be an opening without the stepped recess 329.

The engagement member 320 is the same in a configuration in which the rotation unit 350 is caught on the stop protrusions 353 and a process of being elastically deformed as the present invention 의 second embodiment.

According to the third embodiment of the present invention, there are included the first stop protrusion 340 formed on the outside surface of the lower housing 313, and the second stop protrusion 343 formed on the inner surface of the rotation unit 350 and configured to be caught on the first stop protrusion 340, and the first stop protrusion 340 and the second stop protrusion 343 are engaged with each other and thus the rotation unit 350 and the base unit 310 are rotatably coupled to each other. In this case, the string adjusting device 300 according to the third embodiment of the present invention may be viewed as being in a completely coupled state.

Parts of the first stop protrusion 340 and the second stop protrusion 343 may be provided to be cut out in an azimuthal direction. In this case, the number, angular locations and angular widths of the cutout portions of the first stop protrusion 340 may be different from those of the cutout portions of the second stop protrusion 343.

As shown in FIGS. 13 and 14, the first stop protrusion 340 is formed along the circumference of the outside surface of the lower housing 313 of the base unit 310. As shown in FIG. 15, it can be seen that the second stop protrusion 343 corresponding to the first stop protrusion 340 is formed on the inner surface of the rotation unit 350.

When the string adjusting device 300 enters into a completely coupled state, part of the upper end portion of the second stop protrusion 343 is caught on the lower end portion of the first stop protrusion 340.

As shown in FIG. 15, the first and second stop protrusions 340 and 343 are formed to have an arc-shaped cross section, and the most protruding portions of arcs may be formed to be located at the centers thereof. In other words, the shapes of the cross sections of the first and second stop protrusions 340 and 343 may be exact arc shapes.

In FIG. 15, dotted lines C and C' represent the center lines of the first and second stop protrusions 340 and 343. The most protruding portions are located on the center lines of the first and second stop protrusions 340 and 343.

Referring to FIG. 16, the first and second stop protrusions 345 and 347 are formed to have an arc-shaped cross sections. The most protruding portions of arcs may be formed at locations which are off-centered toward sides from the centers of the stop protrusions.

The difference between the first and second stop protrusions 340 and 343, and 345 and 347 of FIGS. 15 and 16 resides in their shapes. According to FIG. 16, the most protruding portions of the first and second stop protrusions 345 and 347 are formed at locations which are off-centered toward lower sides from the center lines thereof. Furthermore, the most protruding portions of the first and second stop protrusions 345 and 347 may be provided at locations which are off-centered in the direction of the rotation head 351 from the center lines thereof (not shown). This is intended to promote the adjustment of coupling force in a process and state in which the first and second stop protrusions 345 and 347 are engaged with each other as desired.

Meanwhile, although the first and second stop protrusions 345 and 347 have been described with a focus on an example of the two stop protrusions having protruding shapes, they are not necessarily limited thereto. It can been seen that even when one of the first and second stop protrusions 345 and 347 are formed in the shape of a ring-shaped recess or trench recessed along the circumference thereof and the other stop protrusion has a protruding shape, the above-described function can be performed.

Referring to FIG. 15, the third embodiment may include: a through hole 311a configured to communicate with the lower housing 313 and to penetrate the base plate 311; and a stop protrusion 311b configured to be formed along the circumference of the inner surface of the through hole 311a and to be selectively caught on the upper end of the rotation base 370.

FIG. 16 shows a completely coupled state. In this case, the second stop protrusion 343 is located closer to the base plate 370 than the first stop protrusion 340. At the same time, the stop protrusion 311b and the base plate 370 do not come into contact with each other, but are spaced apart from each other by a distance.

Figure 18:
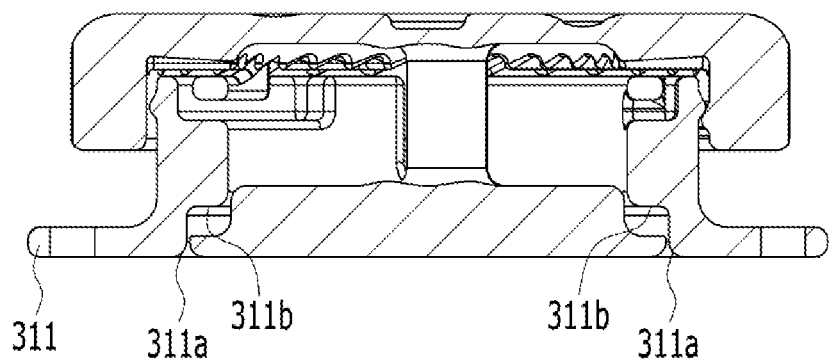
FIG. 18 is a view showing another configuration of the string adjusting device according to the third embodiment of the present invention.

Furthermore, as shown in FIG. 18, the stop protrusion 311b may be formed by forming a step in the inner wall of the lower housing 313 near an entrance on the base plate 311 of the through hole 311a as desired.

The bobbin 360 may be passed through the through hole 311a, and is then located. The rotation base 370 is coupled to be caught on the stop protrusion 311b at an end of the direction of the base plate 311 of the bobbin 360 in the temporarily coupled state of the string adjusting device 300.

This is intended to allow the rotation base 370 to be caught on the stop protrusion 311b and to prevent the rotation unit 350 and the base unit 310 from being completely separated from each other when the coupling of the first and second stop protrusions 340 and 343 has been released.

As shown in FIG. 17, there are included a first stop protrusion 340 formed on the outside surface of the lower housing 313, a second stop protrusion 343 formed on the inner surface of the rotation unit 350 and configured to be caught on the first stop protrusion 340, a through hole 311a configured to communicate with the lower housing 313 and to penetrate the base plate 311, and a stop protrusion 311b formed along the circumference of the inner surface of the through hole 311a and configured to be selectively caught on a surface in the direction of the rotation head 351 of the rotation base 370; and the rotation base 370 may be caught on the stop protrusion 311b while maintaining a state in which part of an end in the direction of the rotation head 351 of the first stop protrusion 340 and part of an end in the direction of the base plate 311 of the second stop protrusion 343 come into contact with each other.

This is intended to prevent the first stop protrusion 340 and the second stop protrusion 343 from being completely separated from each other in a state in which the rotation base 370 is caught on the stop protrusion 311b and to thus prevent movement when the rotation unit 350 and the base unit 310 are relatively rotated and also prevent the base unit 310 and the rotation unit 350 from being completely separated from each other.

Meanwhile, although the string insertion portions 113d, 213a and 313a are described as through holes or openings having U shapes open in one direction in all the embodiments described throughout the overall specification, they are not necessarily limited to the shapes. All openings each composed of a combination of a circular, polygonal or all curves and a rectilinear line can perform the function.

Meanwhile, the string adjusting devices of all the embodiments described throughout the overall specification are characterized in that a difference in thickness or width for length is considerable, and may be applied to all types of objects having the characteristic of being bent and wound. Representative examples thereof include a string, a wire, a rope, a band, etc. In particular, in the case of a band, it can be easily inferred that when the lengths of the string insertion portion and the bobbin are formed to be set in accordance with the width of the band in the string adjusting devices of all the embodiments described throughout the overall specification, a function of winding or accommodating the band can be accomplished.

Existing commercial product string adjusting devices (not shown) mounted on existing tracking shoes, etc. use metallic wire synthetic resin-coated strings (not shown) each formed by coating an internal metallic wire core with a synthetic resin coating, such as a plastic coating. Although the metallic wire synthetic resin-coated string has an advantage in which tensile strength is high, it has a serious disadvantage in which it cannot perform a winding action of being wound at a sharp angle.

The disadvantage results in limitations, i.e., 1) when an existing string adjusting device is mounted on shoes, there occurs inconvenience in which separate string guide portions (not shown) need to be mounted on the shoes in addition to the corresponding string adjusting device, and 2) the diameter of a bobbin inside the string adjusting device needs to be small. Accordingly, it is difficult for the existing string adjusting devices to escape from the limitations in which the diameter is large and the thickness is also large.

In contrast, the diameter and thickness of the string adjusting devices of all the embodiments described throughout the overall specification may be manufactured such that the metallic wire synthetic resin-coated string can be used. The string adjusting devices may be conceived to wind a string at a small diameter such that all types of commonly used strings including nylon, polyester, cotton, and wool strings, etc. can be used. Accordingly, the string adjusting device of the present invention may be manufactured to have a small diameter and a small thickness, and is thus suitable for various product groups requiring a thin and small string adjusting device.

Furthermore, the string adjusting devices of all the embodiments described throughout the overall specification have an advantage in which one or more strings can be simultaneously wound around the string insertion portion and the bobbin. In greater detail, an advantage arises in that when the total thickness of strings passed through the string insertion portion and held on the bobbin is small sufficient to be accommodated within the diameter of the string insertion portion or the size of the space of the string stop portion of the bobbin, one or more strings can be simultaneously wound within the same allowable space.

Furthermore, the string adjusting devices of all the embodiments described throughout the overall specification may be applied to all product groups, i.e., 1) all industrial products requiring a change in characteristic, such as a shape, a structure, or the like, through the adjustment of the length of a string, and 2) all products requiring the intentional adjustment of a characteristic in which the industrial products are connected to the outside through the change in characteristic.

Furthermore, the string adjusting devices of all the embodiments described throughout the overall specification may be applied to all industrial product groups including wearable products requiring string accommodation container functions including a locking function of desirably adjusting the accommodation space and accommodation state of a string which enters and exits through the string insertion portion 113*d*, 213*a*, or 313*a* according to the principle thereof as desired.

Meanwhile, representative examples of such product groups include: 1) shoes, 2) garments (for example, underwear including a brassiere, a corset, all-in-one shaping underwear, etc, and outer clothing including an outdoor jacket, a padding jacket, a gown, a raincoat, etc.), 3) headwear, 4) globes, 5) belts and waist bands, 6) bags, 7) various types of jewelry including a necklace, a pendant, etc., 8) support or protection gears, 9) muscular skeleton support or correction wearable products, 10) wearable products for pets including clothing for pets, a gown, a leash, etc., 11) bedding products including a mattress cover, a pillow cover, a cushion, etc., 12) household products requiring length adjustment, such as a hanger, an accommodation shelf, etc., 13) electronic products using the function of a string, such as earphones, etc., 14) tents, 15) accommodation containers for various types of tape and rolls, 16) umbrellas and awning screens, etc, and may include a wide variety of products.

Accordingly, the concepts of practice in which the string adjusting devices of all the embodiments described throughout the overall specification are applied to the listed product groups are described below. Operation principles are as follows:

1) when a portion of a string mounted in the string adjusting device 100, 200 or 300 and exposed to the outside is mounted to be fastened to a portion of a corresponding product and the string adjusting device is operated, the portion of the corresponding product is moved toward the string adjusting device 100, 200 or 300, thereby adjusting the shape of the product, and 2) when a portion of the string mounted in the string adjusting device 100, 200 or 300 and exposed to the outside is connected to a portion of a corresponding products and is mounted such that the ends of the string meet each other and are connected to each other, and the string adjusting device is operated, the portion of the corresponding product can be moved or deformed by force generated by the string. These two product operation principles are applied to all product groups to be described below in the same manner.

1) Shoes

When the base plate 111, 211 or 311 of the string adjusting device 100, 200 or 300 is mounted to be connected to a tongue or another portion of a shoe, a shoestring is accommodated and held through the string insertion portion 113*d*, 213*a* or 313*a*, and the remaining portions of the shoestring are held in shoestring holes provided in the common shoe, the string adjusting device 100, 200 or 300 may be used as a shoestring adjustment and accommodation device. In this case, the string adjusting device may be mounted to be fastened to a shoe, or may be fastened to a shoe, may not be mounted on the shoe, and may function only to wind a shoestring.

2) Garments

When the base plate 111, 211 or 311 of the string adjusting device 100, 200 or 300 is mounted to be fastened or connected to a portion of a garment, a string is accommodated through the string insertion portion 113*d*, 213*a* or 313*a*, the other end of the string is fastened to and mounted on a portion of the garment, and the string adjusting device 100, 200 or 300 is operated, the portion of the garment fastened to and mounted on the other end of the string is moved toward the string adjusting device 100, 200 or 300. Examples of enhancing the function of a garment by deforming the shape of the garment by using the above principle are shown in FIGS. 20, 21 and 22.

In the case of underwear including a brassiere or all-in-one shaping underwear, for example, when the rotation head 151, 251 or 351 of the string adjusting device 100, 200 or 300 mounted on the center portion of the breasts is rotated, both brassiere cups can be moved to the center and make the shapes of the breasts of a user to be swollen, or the underwear can be tightened to fit the body.

Furthermore, for example, in the case of the sports pants of outdoor wear manufactured to be suitable for outdoor activities by enhancing a cold-, wind- or moisture-proof function, when the rotation head 151, 251 or 351 of the string adjusting device 100, 200 or 300 mounted into a portion of the waist of the pants is rotated, the length of the circumference of the waist of the pants can be decreased. In the case of an outdoor jacket having a hood, the string adjusting device 100, 200 or 300 may be used to adjust the length of the circumference of the hood, waist or end of the garment, thereby enabling the outdoor jacket to come into tighter contact with a portion, such as a face, a waist, or buttocks, desired by a user.

Furthermore, it can be understood that the string adjusting device 100, 200 or 300 can be applied to all types of garments including general dress shirts, jackets, knitwear, etc. as well as the above-described underwear and outdoor garment.

3) Headwear

The base plate 111, 211 or 311 of the string adjusting device 100, 200 or 300 is mounted to be fastened or connected to a portion of headwear, a string is accommodated through the string insertion portion 113*d*, 213*a* or 313*a*, and the other end of the string is connected to a portion of the headwear, for example, a headwear circumference adjusting band, thereby enabling the string adjusting device 100, 200 or 300 to be used to adjust the size of the circumference of the headwear.

4) Globes

The string adjusting device 100, 200 or 300 may be applied to portions of globes, such as wrists. Application examples thereof are the same as the application examples of the headwear.

5) Mufflers and Scarves

In the case of muffler and scarf products wound around necks or worn on shoulders, application examples thereof are the same as the above-described application examples of the garments and headwear. In other words, when the string adjusting device 100, 200 or 300 of the present invention is mounted on a portion of a muffler or scarf, one end or a portion of a string connected to be wound around the string adjusting device is connected to a portion of the muffler or scarf, and the string adjusting device 100, 200 or 300 is operated when necessary, the string is pulled while being wound, and thus a corresponding portion of the muffler or scarf is tightened, thereby preventing a phenomenon in which the muffler or scarf is released and falls down from a user during the actual use thereof.

6) Belts and Waist Bands

When the base plate 111, 211 or 311 of the string adjusting device 100, 200 or 300 is mounted to be fastened or connected to a portion of a belt or waist band, a string is accommodated through the string insertion portion 113*d*, 213*a* or 313*a*, the other end of the string is mounted to be connected to a portion of the belt or waist band, for example, one end, and the string adjusting device 100, 200 or 300 is operated, the portion of the belt or waist band connected to the string is moved toward the string adjusting device 100, 200 or 300, and thus the shape of the belt or waist band is adjusted in accordance with the region of a user where the belt or waist band is worn (not shown)

7) Bags

When the base plate 111, 211 or 311 of the string adjusting device 100, 200 or 300 is mounted to be fastened or connected to a portion of a bag, an end of a string accommodated through the string insertion portion 113*d*, 213*a* or 313*a* is connected to another portion of the bag, and then the device is operated, the string adjusting device 100, 200 or 300 can perform various functions, such as a function of maintaining the shape of the bag subjected to internal pressure to the outside because the bag is fully filled with contents, a function of selectively opening and closing the entrance of the bag, a function of easily adjusting the length of the grip portion of the bag, etc. In this case, examples of one portion and another portion of the bag include a number of examples, such as a) one wide surface or part of the corner of the bag, and the opposite wide surface and part of the corner of the bag, b) part of one narrow side surface and part of another side surface of a bag body, c) a bag grip string and a bag body, d) part of a band performing a function of selectively opening and closing the entrance of the bag and a bag body, etc.

8) Various Types of Jewelry Including Necklaces, Pendants, Bracelets, Etc.

Most ornamental products, such as a necklace, a pendant, a bracelet, etc., basically have a form in which at least one ornamental material hangs on a necklace chain, a pendant chain, a bracelet chain, or the like having a shape similar to that of a string. When the string adjusting device 100, 200 or 300 is applied as the ornamental material and mounted on the necklace chain, the bracelet chain, the pendant chain, or the like, the length of the corresponding product can be easily adjusted in accordance with the demand of a user (not shown).

9) Human Body Support or Protection Gears

There are various types of support or protection products which are required to support or correct a joint or muscular skeleton of the human body. These products are devices which compress and confirm a worn region after wearing. When the string adjusting device 100, 200 or 300 is mounted on such a portion of a support or protection product, a string is mounted on a portion of the product, and the string adjusting device 100, 200 or 300 is operated, the distance between connected portions of the support or protection product decreases as the length of the string decreases, thereby enabling a worn region to be supported while compressing the worn region.

10) Muscular Skeleton Support or Correction Wearable Products

The string adjusting device 100, 200 or 300 may be applied based on the same operation principle for the support or protection gear. In particular, a plurality of string adjusting devices 100, 200 or 300 is mounted on a human body correction corset or the like and selectively connected to a plurality of locations of the corset or the like, and a worn region is compressed using various methods, i.e., in various directions and at various locations, thereby increasing a correction effect.

11) Wearable Products for Pets Including Clothing, Gowns, Leashes, Etc.

There are various clothing products for pets, like for humans. Of these clothing, there are various products containing strings so that the shapes thereof can be adjusted in accordance with pets. The principle by which the string adjusting device 100, 200 or 300 is applied to the products is the same as that of the above-described garment cases.

12) Bedding Products Including Mattress Covers, Pillow Covers, Cushions, Etc.

Various bedding products are configured such that cushions are present therein and the entrances of covers surrounding the cushions are tightened by means of strings. When the string adjusting device 100, 200 or 300 is mounted on the cover of such a bedding product so that the same application method for the case of garments worn on the human body of a user can be applied and is then operated, the size of the opening of the entrance of the bedding product can be adjusted and also the overall shape thereof can be adjusted.

13) Household Products Requiring Length Adjustment, such as Hangers, Accommodation Shelves, Etc.

It is preferred that various types of household accommodation devices, such as a hanger, are basically provided with a stick or rod structure function capable of adjusting length. The string adjusting device 100, 200 or 300 is mounted on an inner or outer portion of a single rod (rod A), a portion of a string mounted on the string adjusting device 100, 200 or 300 is connected to a portion of another rod (rod B), and rod A and rod B are connected to each other by, for example, inserting them into each other so that they can be relatively moved, thereby forming a single rod structure. When the string is mounted to be fastened to the rod B and the string adjusting device 100, 200 or 300 is operated, rod A and rod B may be moved to be close to each other.

Furthermore, in the case where the string connected to the rod B is further extended and returned to and mounted on the string adjusting device by means of a method of passing through a guide (not shown) configured to directing a string to a direction toward rod A at another fixed point, and thus a closed string structure is formed, when the string adjusting device 100, 200 or 300 is operated, rod B and rod A are moved in a direction away from each other, the total length of rod A and rod B can be increased.

When the rod structure equipped with the string adjusting device is the structure of a household accommodation device product, such as a hanger or the like, a household accommodation device product, such as a hanger or the like, capable of changing the size and width thereof can be accomplished.

14) Electronic Products Using the Function of a String, such as Earphones, Etc.

Various earphone products are used to enable users' ears to hear sounds which are output from mobile devices. Earphones portions worn on ears and a sound generation device, such as a mobile device or the like, are connected by a string. These existing earphone products require a device capable of conveniently adjusting the length of a string. When the string adjusting device 100, 200 or 300 is mounted on a portion of an earphone string, is defined as a device functioning to wind the earphone string, and is then operated, the length of the earphone string is adjusted and accommodated within the inner space of the string adjusting device, and also the user can conveniently manage the earphone string.

15) Tents

Various types of tents use various connected ropes in order to erect and maintain the shapes thereof. Ropes or lines used for a tent may be each mounted on the string adjusting device 100, 200 or 300, and thus the lengths of the ropes can be adjusted, the erected shape of the tent can be maintained by applying force to various portions of the tent, and the string adjusting device 100, 200 or 300 can be conveniently used when the tent is folded and stored while not in use.

16) Various Types of Tape and Rolls

Office adhesive tape, such as Scotch tape or the like, is configured to come into contact with a type of protruding cylindrical structure inside a plastic housing and to be then rotated by being wound around the protruding cylindrical structure. Alternatively, a paper, synthetic resin, or metallic roll is also wound around a cylindrical structure and is then accommodated, and the wound tape or paper roll is unwound in a direction in which the tape or paper roll is extended as the cylindrical structure is reversely rotated in use. The string adjusting device 100, 200 or 300 may be used as a length adjusting accommodation container capable of accommodating and discharging the tape or roll.

17) Umbrellas, Parasols, and Awning Screens

The core structure of an umbrella or parasol includes a grip mounted at one end of a long rod-shaped column, umbrella ribs configured to protrude from the other end of the umbrella, and a stretcher configured to connect the umbrella ribs and the rod-shaped column as core parts. The angle at which the umbrella is unfolded can be adjusted by means of a runner which is connected to the stretcher and which adjusts the unfolding of the umbrella performed by the stretcher by moving the rod-shaped column of the umbrella.

When the string adjusting device 100, 200 or 300 of the present invention is mounted on the grip portion of the umbrella or parasol, a string is moved into the rod-shaped column, the other end of the string is directly connected to the umbrella ribs, and the string is wound by rotating the string adjusting device, the angle at which the umbrella or parasol is unfolded can be adjusted by spreading the umbrella ribs. In other words, a simpler umbrella or parasol structure without the stretcher and the runner can be implemented. It can be understood that this principle can be also applied to an awning screen structure which is installed in a building or an outdoor area.

Electric/electronic sensors (not shown) configured to measure various physical variables including force, a shape, a location, posture, time, acceleration, vibration, temperature, humidity, pressure, sound, light, an electromagnetic field, etc. may be attached to or contained in and used in the string adjusting devices of all the embodiments described throughout the overall specification. Alternatively, the string adjusting devices may be connected to independent sensor devices (not shown) configured to measure the physical variables, and may be used in the vicinity of the sensor devices. Furthermore, the string adjusting devices may be used in conjunction with mobile devices (not shown) including a smart watch (not shown) and a mobile phone (not shown).

Therefore, the range of the present invention is defined by the attached claims which are supported by the detailed description of the present specification. It should be appreciated that all alterations or modifications derived from the meanings and scope of the claims and concepts equivalent to the claims are included in the range of the present invention.

The invention claimed is:

1. A string adjusting device, comprising:
 a base unit including a base plate, a cylindrical lower housing provided on the base plate, and an engagement member configured such that one end thereof is fastened to an outer surface of the lower housing and provided to be elastically deformable; and
 a rotation unit including a bobbin rotatably installed inside the housing and configured such that a string is wound therearound, a rotation head connected to one end portion of the bobbin, and stop protrusions formed to protrude from an inner surface of the rotation head to be caught on the engagement member,
 wherein the engagement member is configured to include a fixed end formed as one end thereof and a free end configured to be elastically deformable around the fixed end and to be caught on the stop protrusions.

2. A string adjusting device, comprising:
 a base unit including a base plate, a cylindrical lower housing provided on the base plate, and an engagement member configured such that one end thereof is fastened to an inner surface of the lower housing and provided to be elastically deformable; and a rotation unit including a bobbin rotatably installed inside the housing and configured such that a string is wound therearound, a rotation head connected to one end portion of the bobbin, and stop protrusions formed to protrude from an inner surface of the rotation head to be caught on the engagement member, wherein the engagement member is configured to include a fixed end formed as one end thereof and a free end configured to be elastically deformable around the fixed end and to be caught on the stop protrusions.

3. The string adjusting device of claim 2, wherein the engagement member further comprises:

a first stop protrusion formed to protrude from the free end toward the stop protrusions;

a second stop protrusion formed to be spaced apart from the first stop protrusion by a preset distance and to protrude; and an inclined portion formed to be inclined with respect to the second stop protrusion to thus allow the stop protrusions to move over the second stop protrusion.

4. The string adjusting device of claim 2, wherein:

a string holding portion configured to receive a string is formed to penetrate a center of the bobbin, and string insertion portions configured to allow a string to pass through the string holding portion and exit to an outside are formed to penetrate opposite surface portions of the lower housing.

5. The string adjusting device of claim 2, further comprising:

a first stop protrusion formed to protrude from an outside surface of the lower housing; and a second stop protrusion formed to protrude from an inner surface of the rotation unit, and to be caught on the first stop protrusion;

wherein the first stop protrusion and the second stop protrusion are rotatably coupled to each other by being caught on each other.

6. The string adjusting device of claim 5, wherein the first and second stop protrusions are formed to have arc-shaped cross sections, and most protruding portions of arcs are formed at locations which are off-centered to sides based on centers of the stop protrusions.

7. The string adjusting device of claim 5, wherein the first and second stop protrusions are formed to have arc-shaped cross sections, and most protruding portions of arcs are formed to be located at centers of the stop protrusions.

8. The string adjusting device of claim 2, further comprising:

a through hole configured to communicate with the lower housing, and to penetrate the base plate; and a stop protrusion formed to protrude from a circumference of an inner surface of the through hole, and to be selectively caught on an upper end of the rotation base.

9. The string adjusting device of claim 2, further comprising:

a first stop protrusion formed to protrude from an outside surface of the lower housing; and a second stop protrusion formed to protrude from an inner surface of the rotation unit, and to be caught on the first stop protrusion;

a through hole configured to communicate with the lower housing, and to penetrate the base plate; and a stop protrusion formed to protrude from a circumference of an inner surface of the through hole, and to be selectively caught on an upper end of the rotation base;

wherein when an upper end of the first stop protrusion and a lower end of the second stop protrusion are located to come into contact with each other, the rotation base is caught on the stop protrusion.

* * * * *